US006953119B1

(12) United States Patent
Wening

(10) Patent No.: US 6,953,119 B1
(45) Date of Patent: Oct. 11, 2005

(54) SYSTEM FOR GATHERING DISCARDED POST-CONSUMER CARPET, FOR RECYCLING

(76) Inventor: Scott Wening, 2053 Alboranda Dr., Camarillo, CA (US) 93010

( * ) Notice: Subject to any disclaimer, the term of this patent is extended or adjusted under 35 U.S.C. 154(b) by 93 days.

(21) Appl. No.: 10/406,857

(22) Filed: Apr. 4, 2003

Related U.S. Application Data

(60) Provisional application No. 60/369,649, filed on Apr. 4, 2002.

(51) Int. Cl.[7] .............................................. B07C 5/02
(52) U.S. Cl. ...................................... 209/3.3; 209/583
(58) Field of Search ......................... 209/3.1, 3.3, 547, 209/583, 930; 241/24.12, 24.13, 24.14, 24.18, 241/79; 705/400, 414

(56) References Cited

U.S. PATENT DOCUMENTS

| | | | |
|---|---|---|---|
| 4,949,528 A * | 8/1990 | Palik ............................ | 53/429 |
| 5,072,833 A * | 12/1991 | Hansen et al. ................ | 209/3.3 |
| 5,240,530 A * | 8/1993 | Fink .............................. | 156/94 |
| 5,535,945 A * | 7/1996 | Sferrazza et al. ......... | 241/24.12 |
| 5,952,660 A | 9/1999 | Kip et al. | |
| 6,341,699 B1 | 1/2002 | Langerak et al. | |
| 2002/0074075 A1 * | 6/2002 | Brown et al. .................. | 156/94 |
| 2003/0075824 A1 * | 4/2003 | Moore et al. ................ | 264/143 |
| 2004/0153372 A1 * | 8/2004 | Pilzer ........................... | 705/26 |

FOREIGN PATENT DOCUMENTS

EP        0372906        6/1999

OTHER PUBLICATIONS

Robert Simpson, Used Carpet Recycling, Mar. 2000, Flooring Magazine, 5 pages.*

* cited by examiner

Primary Examiner—Donald P. Walsh
Assistant Examiner—Joseph C Rodriguez
(74) Attorney, Agent, or Firm—Marvin E. Jacobs

(57) ABSTRACT

A carpet disposal method, comprising: collecting carpet, performed by a collection agent having a unique identifier; assigning the collection agent unique identifier to the collected carpet; transporting the uniquely identified carpet to a processing plant; identifying the collection agent of the uniquely identified carpet at the processing plant; sorting the uniquely identified carpet; valuing the sorted carpet; paying the identified collection agent the value of the sorted carpet; and carpet disposal system comprising: a carpet collector that collects carpet, a collection agent having a unique identifier; an assigner that assigns the collection agent unique identifier to the collected carpet; a transporter that transports the uniquely identified carpet to a processing plant; an identifier that identifies the collection agent of the uniquely identified carpet; a sorter that sorts the uniquely identified carpet; a valuer that values the sorted carpet; a payer that pays the identified collection agent the sorted carpet value.

46 Claims, 23 Drawing Sheets

SYSTEM FOR GATHERING DISCARDED POST-CONSUMER CARPET, FOR RECYCLING

This application claims benefit of Provisional Application No. 60/369,649, filed Apr. 4, 2002.

FIELD OF THE INVENTION

The present invention relates generally to collecting and gathering used and discarded post-consumer carpet, for shredding and recycling, so that the polymers in discarded carpet (mainly nylon fibers from the tufting material, and polypropylene from the backing layer) can be used productively, rather than being disposed of in landfills.

BACKGROUND OF THE INVENTION

A number of efforts have been made to organize and run carpet recycling operations in an efficient and profitable manner. None of the prior efforts have succeeded, and most companies that have attempted to undertake this effort have gone bankrupt, or were shut down by a parent company, after losing millions of dollars. Although few details of such failed efforts have ever been published, many people who have worked with carpet recycling efforts are familiar with a number of past failures, which can be exemplified by the bankruptcy of United Recycling, Inc. (Minneapolis, Minn.) in the 1990's, and the decision by the Honeywell Company to halt the operations of its "Evergreen" recycling operation in Georgia in 2001. Numerous other examples could also be named.

At the current time (i.e., prior to the adoption of the system disclosed herein), nearly all companies that are still trying to work with carpet recycling must simply ignore and disregard the largest category (by far) of all waste carpet that is being disposed of today. This category is usually called "post-consumer carpet" (often abbreviated as PCC), and it includes any and all carpet that has been installed and actually walked on, in any type of building or facility (such as a residence, office, retail store, restaurant, etc). Since so many companies that tried to handle post-consumer carpet went bankrupt and never managed to succeed, most carpet recyclers that are still in business today barely survive economically, and limit their efforts to only a small portion of the carpet business, which is limited to so-called "post-industrial" waste, which includes materials such as: (i) clean, never-installed rolls of carpet which are being discarded because they didn't meet color or quality standards, or because they are surplus inventory that was not expected to sell; (ii) scrap or waste material that was generated as a byproduct of a manufacturing process, such as when the edges of carpets are trimmed off when carpet rolls are cut down to 12-foot widths; and, (iii) various other types of scraps, byproducts, or other wastes that are generated during textile or fiber manufacturing or other handling operations.

Although clean and never-used "post-industrial" carpet waste (and other post-industrial textile and fiber waste) is created in quantities that would seem surprisingly large to most people, the fact is that post-consumer carpet (i.e., which has been installed and walked on, and which was subsequently removed from a floor) comprises the largest fraction (by far) of carpet that is discarded each year in any industrial nation. Since most carpet recyclers refuse to even try to handle post-consumer carpet, an estimated 5 billion pounds of used post-consumer carpet are being buried, every year, in landfills in the U.S. Since a million pounds of discarded carpet will cover roughly 2 acres of land, one foot deep, the fact that multiple billions of pounds of carpet are being sent to landfills, every year, poses a major solid waste problem. The polymer fibers in carpet will not biodegrade for hundreds or even thousands of years; therefore, discarded carpet segments will just continue to sit in landfills, taking up huge amounts of bulk space.

In addition, even though it won't biodegrade, discarded carpet that gets wet quickly becomes an ideal incubator for mold, mildew, and other noxious microbes that emit foul odors and leachates. That microbial growth will attract insects, which in turn will attract vermin, birds, etc.

Numerous people and government agencies have recognized that continuing to send staggeringly large quantities of discarded carpet to landfills is simply unacceptable, and better alternatives must be developed. Two important recent developments along those lines were recently launched by a group of companies, carpet industry organizations, and officials at state and federal environmental protection agencies, who met in Atlanta, Ga. in January 2002 and signed a document called, "A Memorandum of Understanding for Carpet Stewardship." This document, along with copies or summaries of various other documents and developments that preceded it, are summarized and/or available for downloading at www.moea.state.mn.us/carpet/index.cfm, on a website run by the Minnesota Office of Environmental Assistance (MOEA), which has been one of the most active moving forces behind the drive to recycle carpet, and which also has been a major force in the Midwestern Workgroup on Carpet Recycling. The Carpet and Rug Institute, an industry organization that includes more than 90% of the carpet industry in the U.S as its members, also signed and endorsed that Memorandum in January 2002.

The same companies, agencies, and organizations that created and signed the Memorandum on Carpet Stewardship also created an organization called "Carpet America Recovery Effort" (CARE), which will soon have a website, at www.carpetrecycle.org. CARE is intended to function as a consortium and coordinating body; instead of being owned or controlled by any single participant in the field, it will be responsible to all companies and agencies that helped create it, and it will help organize, motivate, coordinate, and publicize efforts to achieve the goals set forth in the Memorandum.

The Memorandum itself merely set forth some general goals, which include two major goals with a target date that was set ten years in the future. According to the Memorandum, by the year 2012, the industry should be recycling at least 20 to 25% of all carpet; and, the industry should be using methods such recycling, reuse, burning in cement kilns, etc., to divert at least 40% of the carpet that would otherwise be sent to landfills.

However, the Memorandum explicitly stated that none of its goals were binding or enforceable in any way, and nothing in that Memorandum created any legal obligations or rights. It was merely a statement of goals, without describing any means or methods for accomplishing those goals, and its main target date was a full decade in the future. Accordingly, it offers an overview of the problem, and now it's up to people and companies working in this field to find some answers.

One problem that has severely hindered and frustrated all efforts to recycle post-consumer carpet over the years has been the difficulty of sorting and separating discarded carpet segments into types of polymers, such as nylon-6, nylon-6,6, PET, polypropylene, and mixed polymer weaves. Because of certain chemical structures in polymerized strands of nylon, the two major classes of nylon used in carpet manufacturing are called nylon-6, and nylon-6,6; these two types of nylon account for roughly 70% of all carpet being manufactured. Although both names contain the digit "6", those two different forms of nylon have substantially different chemistry. If mixed together, they cannot be melted or chemically treated without creating serious problems in the resulting chemical product.

It is not difficult for a manufacturing company or wholesaler to clearly label never-used carpet as either nylon-6 or nylon-6,6; however, it would be very difficult and expensive for a carpet recycling company to make that same distinction, for each and every one of the thousands of rolls or piles of used post-consumer carpet that would arrive at a large and active shredding or processing facility, every week. This is one of the main reasons why no companies have yet been able to make a substantial profit by handling post-consumer carpet, and why nearly all companies that are still working with carpet recycling today have sharply restricted limited their activities, and will accept only clean "post-industrial" carpet waste, such as manufacturing scrap, and carpet rolls that were rejected for quality reasons or discarded as unwanted surplus inventory.

Another problem that has blocked and frustrated efforts to develop efficient and economical methods for collecting discarded post-consumer carpet relates to the fact that, in nearly any large city, new carpets are installed (and old carpets are removed) by numerous small companies. In almost all cases, the same workers who will be installing a new carpet will also be responsible for removing any old carpets that must be removed and discarded. Due to a combination of financial factors that have major impacts on the net profits of any carpet seller (including taxes, liability risks, insurance concerns, employee benefit costs, etc.), nearly all carpet installers work as independent contractors. Very few carpet installing companies have more than 10 employees, and the large majority of such companies have only one or two trucks. Many of these companies use immigrant laborers, who often speak little or no English, and many of those workers are not even employees; instead, they are hired on a day-to-day, as-needed basis, depending on how much work is scheduled for a given day. The typical workday starts by about 7 am, and ends by about 3 or 4 pm, when the loaded truck drops off the load of old carpet that was removed from a job site, and then drops off the workers, who have the rest of the afternoon free.

On a typical job, any old and worn carpet that must be removed from the job site is usually cut into strips, up to about 6 feet wide. These strips are then cut into convenient lengths, and the resulting strips are rolled up and tied at both ends, most commonly by using cheap twine, duct tape, etc. This creates rolls of discarded carpet which typically weigh in the range of about 50 to about 80 pounds. These rolls, which are often referred to as "cigar rolls", are light enough and short enough to allow a single worker to hoist a roll onto one shoulder, and carry it out to the truck without needing help from another worker. This method of cutting and rolling discarded carpets into rolls less than about 6 feet long also reduces the risk that a worker carrying a roll on one shoulder might trip and fall, bang the end of the roll into a light fixture or door jamb, or scrape and damage the finish on a piece of furniture, wall, or door.

When the truck has been loaded with the worn discarded carpet and is ready to leave the job site, the driver will take it to any destination that will accept rolls of used and worn carpet. Reputable carpet installers usually take these rolls to landfill sites, or to a collection bin or cage which is adjacent to, or run by, the store or warehouse that sold the carpet they installed that day. However, landfill owners charge money for drop-offs, and the place that sold the carpet may be out of the way, for an installer who wants to finish up and start enjoying the rest of the afternoon. Inevitably, a substantial amount of post-consumer carpet simply gets dumped, in inappropriate and often illegal locations.

U.S. Pat. No. 6,341,699 (Langerak, et al.) discloses a method and apparatus for sorting carpet or similar types of material. The invention relates to a method for sorting carpet or similar pieces of material to material type and the like, wherein the method comprises the following steps of: placing pieces of carpet on a transport system; disentangling or separating the pieces of carpet on a transport system; fixing pieces of carpet individually to a guide system; recognizing the type of carpet during movement along the guide system; and releasing a piece of carpet into or onto a relevant location determined by the recognition.

U.S. Pat. No. 5,952,660 (Kip, et al.) discloses a method of identifying post consumer or post industrial waste carpet utilizing a hand-held infrared spectrometer. Kip describes a method and apparatus for use in the recycling of post consumer or post industrial waste carpet or Polyamide-6 and/or Polyamide-66 containing non-carpet waste utilizes a hand-held portable device utilizing spectroscopic principles to identify the material of the waste (carpet). The spectrometer envisioned for this task includes an infrared radiation source for illuminating the waste (carpet) sample, a selector for selecting a predetermined number of discrete wavelengths and a detection system to detect reflected radiation within the discrete wavelengths. The selector can be either a plate with a plurality of slots which positionally correspond to locations in a dispersed light beam according to the predetermined discrete wavelengths or a plurality of filters selected to pass the discrete wavelengths. The selection of the discrete wavelengths can either take place before the carpet sample is irradiated or can take place by selecting the discrete wavelengths from reflected radiation.

European Patent No. EP0372906 (Foster) discloses an article sorting apparatus. A method and apparatus for sorting articles from a series of batched collection of articles, so that a tally is kept of how many articles of a given type are received from each one of a variety of sources in a series of batched collections, is disclosed. The method avoids the task of attaching an identification tag to each article, and includes the steps of attaching each of the articles in a collection sequentially to clip means associated with a transporter device, attaching, adjacent to the sequentially suspended collection of articles, means indicating, by use of coded data provided thereupon, the origin or identity of the collection, moving the clip means and the articles suspended therefrom along the transporter device, viewing each article on the transporter device at a data keying station, and keying data to a computer to identify the type of article and its sequential position in the collection on the transporter device, forwarding the articles to a series of switch means and causing selected ones of the switch means to operate to open a clip means in a computer-controlled sequence determined by the keyed-in identifying data, so that all articles of any one type are released at a pre-determined position on the transporter device appropriate to that type.

This overview is not meant to be critical or derogatory; it is simply intended to help the reader understand why no company trying to recycle post-consumer carpet has ever succeeded in creating an effective way to organize dozens or hundreds of independent small-company carpet installers, in a large city, into a trained and cooperating network that will function in a smoothly coordinated manner, to ensure that worn and discarded carpet segments will be properly delivered to a recycling facility.

Accordingly, one object of this invention is to create a coordinated system that will allow numerous independent contractors that are already working as carpet installers to deliver post-consumer carpet to a recycling facility in an economical and efficient manner that can generate a fair profit for the carpet installers.

Another object of this invention is to disclose a system of interacting machines and devices that will provide a collection system for post-consumer carpet, which can be used efficiently and reliably by dozens or hundreds of independent contractors, without requiring those contractors to go through extensive training, or deal with cumbersome and annoying paperwork and administrative chores.

Another object of this invention is to create and provide a collection system for used carpet which meshes smoothly with the existing practices and customs of most carpet installing contractors, and which will be adapted quickly and efficiently by carpet installers because it offers a simple and practical method for them to reap additional income and profits from their ongoing operations.

Another object of this invention is to establish and provide a carpet collection and recycling system that provides a relatively tamper-resistant accounting and payment system that provides carpet installers with prompt cash payments for participating in the system.

Another object of this invention is to establish and provide a system that allows bar-coded tags or labels to be used to allow rapid and accurate identification of rolls of used carpet, using computerized scanners, in a recycling operation.

Another object of this invention is to provide a system that will allow a carpet recycling company to have numerous small batches of dirty post-consumer carpet delivered to it, each day or week, by numerous carpet installer companies, in a manner which allows those rolls to be passed through scanning and sorting machines that can rapidly sort the batches into appropriate categories for subsequent handling.

Another object of this invention is to provide a system that will allow relatively small batches of used and dirty carpet to be delivered to a number of distributed shipping containers, which can be stored in convenient parking locations, and which can be closed and locked to protect the collected carpet from rain, theft, vermin, and other hazards, and which will allow the shipping containers, when reasonably full, to be conveniently hauled away from their parking locations, taken to a central recycling plant, and replaced by empty containers at the same parking locations.

Another object of this invention is to create and provide a carpet recycling system that can use automated equipment, such as x-ray machines and/or metal detectors, to scan arriving rolls of used discarded carpet, to ensure that they do not contain metallic or other unwanted hard objects which are larger than staples, and which might damage the equipment or possibly injure nearby employees, if loaded into a chopping or shredding machine. In addition, another related object of this invention is to provide a semi-automated system that allows rolls of discarded carpet which contain metal debris or other unwanted hard objects (larger than staples) to be diverted, automatically, into a separate handling system, which will allow the metallic or other undesired objects to be removed, and which will then allow the remaining carpet segments to be returned to the conveyor system, for chopping and shredding.

These and other objects of the invention will become more apparent through the following summary, drawings, and description of the preferred embodiments.

SUMMARY OF THE INVENTION

The present invention is directed to a carpet disposal method and system, comprising: collecting carpet, the carpet collecting performed by a collection agent, the collection agent having a unique identifier; assigning the collection agent unique identifier to the collected carpet; transporting the uniquely identified carpet to a processing plant; identifying the collection agent of the uniquely identified carpet at the processing plant; sorting the uniquely identified carpet; valuing the sorted carpet; and paying the identified collection agent the value of the sorted carpet. The unique identifier may comprise a unique code and/or bar code. The carpet disposal method and system may have computer means for managing the identification of the collection agent of the uniquely identified carpet at the processing plant, sorting the uniquely identified carpet, valuing the sorted carpet, and paying the identified collection agent the value of the sorted carpet.

A carpet disposal method having features of the present invention comprises: collecting carpet, the carpet collecting performed by a collection agent, the collection agent having a unique identifier; assigning the collection agent unique identifier to the collected carpet; transporting the uniquely identified carpet to a processing plant; identifying the collection agent of the uniquely identified carpet at the processing plant; sorting the uniquely identified carpet; valuing the sorted carpet; paying the identified collection agent the value of the sorted carpet.

A carpet disposal system having features of the present invention comprises: means for collecting carpet, the carpet collection means performed by a collection agent, the collection agent having a unique identifier; means for assigning the collection agent unique identifier to the collected carpet; means for transporting the uniquely identified carpet to a processing plant; an identifier adapted to identify the collection agent of the uniquely identified carpet at the processing plant; means for sorting the uniquely identified carpet; means for valuing the sorted carpet; means for paying the identified collection agent the value of the sorted carpet.

A coordinated system of machines and devices is disclosed, for efficiently collecting worn and discarded post-consumer carpet, so it can be recycled. This system, which will cover a substantial geographical area such as a large city, county, or other region, is designed to be owned and run by a single company or organization, which will provide a set of equipment, devices, and procedures that will allow it to interact smoothly and efficiently with dozens or hundreds of independent contractors who install new carpets in that city, county, or region, and who also remove the old carpets from job sites as part of installing new carpet.

Each installer that participates in this system will be given a large number of tags or labels, having a bar-coded number which is unique to that installer, and which can be quickly read by a hand-held scanning device, as commonly used in retail stores. A coded tag, adhesive sticker, or other suitable label which identifies the installer company or person will be tied or otherwise affixed to each segment of carpet that is being rolled up for disposal, at each job site where that installer works. Discarded carpet rolls will be dropped off, by numerous installers, at lockable collection trailers which will be distributed at various locations (such as in parking lots of carpet stores and warehouses) around a city, county, or region. When a collection trailer is reasonably full, a diesel tractor will haul it to a receiving facility, where the carpet batches will be loaded onto a conveyor system that will carry them through scanning, sorting, chopping, and shredding machines.

Some sorting and shredding facilities also will contain machines to manufacture shredded carpet fibers into salable products or intermediates, such as needle-punched mats, plywood substitutes, recovered monomers, etc. Other sorting and shredding facilities may simply gather and bind sorted and shredded carpet fibers into large bales that will be shipped elsewhere for use in manufacturing, burning, or other operations.

DRAWINGS

These and other features, aspects, and advantages of the present invention will become better understood with regard to the following description, appended claims, and accompanying drawing where:

DETAILED DESCRIPTION

As briefly summarized above, this system comprises a coordinated set of machines and other physical devices, which can be used to establish and run an efficient and economic system for collecting and processing worn and discarded post-consumer carpet, to enable recycling and other appropriate use of the polymeric fibers in the discarded post-consumer carpet.

A complete system, which will cover a substantial geographical area such as a large city, county, or other region, is designed to be run by a single company or organization, which will allow that company to interact efficiently with dozens or hundreds of independent contractors who work in that area.

Most commonly, these independent contractors will be the same people or companies that install new carpets in homes, offices, stores, and other buildings in the area, since these contractors typically also remove the old carpet from a job site, as part of the job of installing new carpet. However, any other type of contractor (such as a demolition contractor) or other operator (such as employees who work for a carpet retailing or wholesaling operation) can also join into this same type of cooperating network, on the same general basis.

Each contractor that participates in this system will be given a large number of tags or labels, each one having a bar-coded number which is unique to that company (or person), and which can be quickly read by a hand-held scanning device, as commonly used in retail stores. A coded tag or label which identifies that contractor's assigned number will be tied or otherwise affixed to each segment of old carpet that is being rolled up for disposal, at each job site where that installer works. Discarded carpet rolls will be dropped off, by numerous contractors, at lockable collection trailers which will be distributed at various locations (such as in parking lots of carpet stores and warehouses) around a city, county, or region.

It is anticipated that each contractor which participates in this system will need some form of relatively brief training or orientation. This presumably will take no longer than an hour, and can be carried out on an inexpensive and repetitive basis by means of a videotape.

In general, all delivery rules that will be adopted and enforced by this system will be designed to align closely with the normal practices that are already used by carpet installers, so that training requirements and expenses, and the frequency of mistakes or other noncompliance, will be minimal. As examples, the rules might require that any roll of carpet deposited into a collection trailer must be rolled up, tied by cheap twine, in rolls that are no heavier than 90 pounds and not more than 7 feet long. These requirements probably would already be met by at least 95% of all post-consumer carpet rolls being discarded today.

Figure 1:
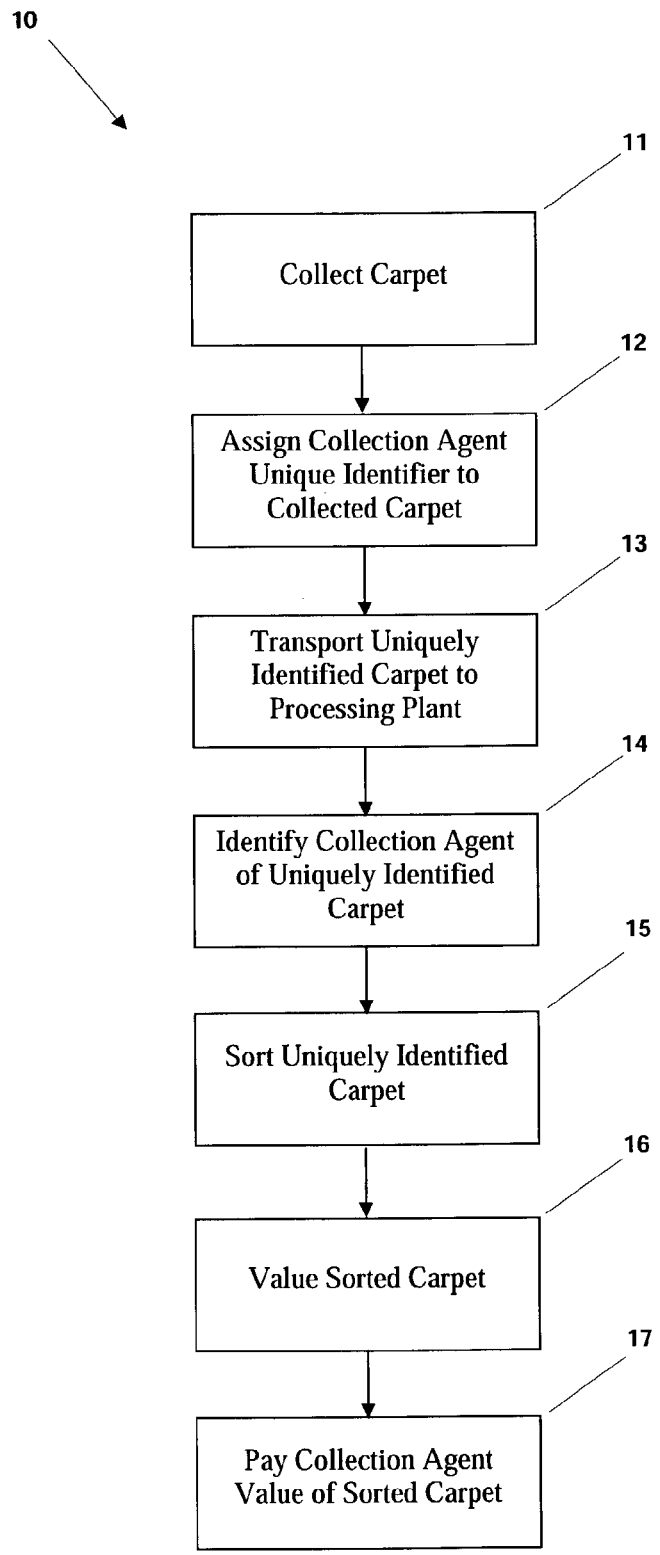
FIG. 1 is a schematic representation of steps of a carpet disposal method of the present invention.

FIG. 1 is a schematic representation of steps of a carpet disposal method (10) of the present invention, comprising: a) collecting carpet (11), the carpet collecting performed by a collection agent, the collection agent having a unique identifier; b) assigning the collection agent unique identifier to the collected carpet (12); c) transporting the uniquely identified carpet to a processing plant (13); d) identifying the collection agent of the uniquely identified carpet at the processing plant (14); e) sorting the uniquely identified carpet (15); f) valuing the sorted carpet (16); g) paying the identified collection agent the value of the sorted carpet (17).

Figure 2:
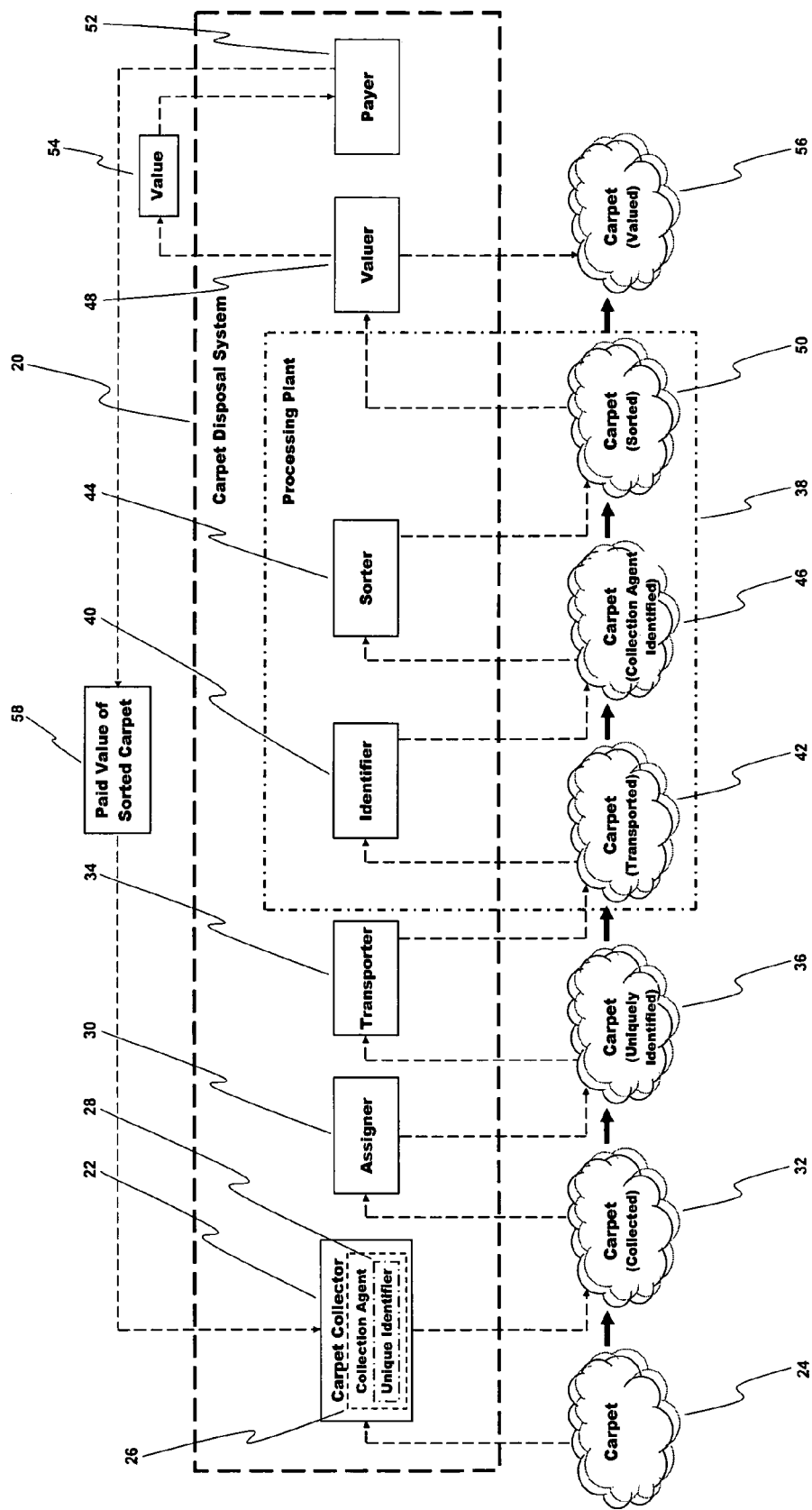
FIG. 2 is a schematic representation of a carpet disposal system of the present invention.

FIG. 2 is a schematic representation of a carpet disposal system (20), comprising: a) a carpet collector (22) that collects carpet (24), the carpet collection performed by a collection agent (26), the collection agent (26) having a unique identifier (28); b) an assigner (30) that assigns the collection agent unique identifier (28) to the collected carpet (32); c) a transporter (34) that transports the uniquely identified carpet (36) to a processing plant (38); d) an identifier (40) that identifies the collection agent (26) of the uniquely identified (transported) carpet (42) at the processing plant (38); e) a sorter (44) that sorts the uniquely identified (collection agent identified) carpet (46); f) a valuer (48) that values the sorted carpet (50); g) a payer (52) that pays the identified collection agent (26) the value (54) of the sorted carpet (50). The valued carpet (56) and the paid value (58) of the sorted carpet (50) are also shown in FIG. 2.

Figure 3:
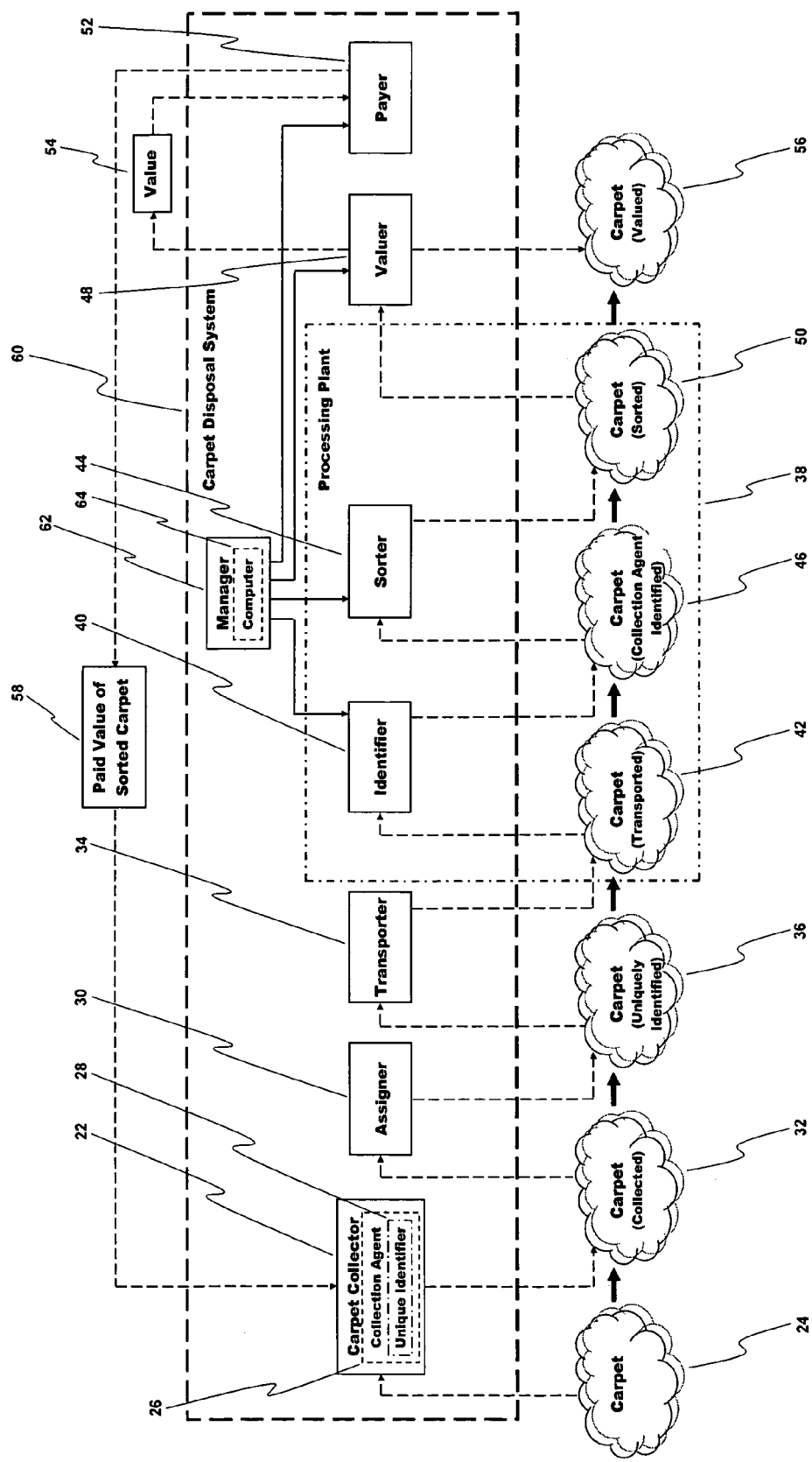
FIG. 3 is a schematic representation of an alternate embodiment of a carpet disposal system of the present invention, comprising a manager comprising a computer.

FIG. 3 is a schematic representation of an alternate embodiment of a carpet disposal system (60), which is substantially the same as the carpet disposal system (20), except that the carpet disposal system (60) further comprises a manager (62) comprising a computer (64) that manages: the identifier (40) that identifies the collection agent (26) of the uniquely identified (transported) carpet (42) at the processing plant (38); the sorter (44) that sorts the uniquely identified (collection agent identified) carpet (46); the valuer (48) that values the sorted carpet (50); the payer (52) that pays the identified collection agent (26) the value (54) of the sorted carpet (50).

Figure 4:
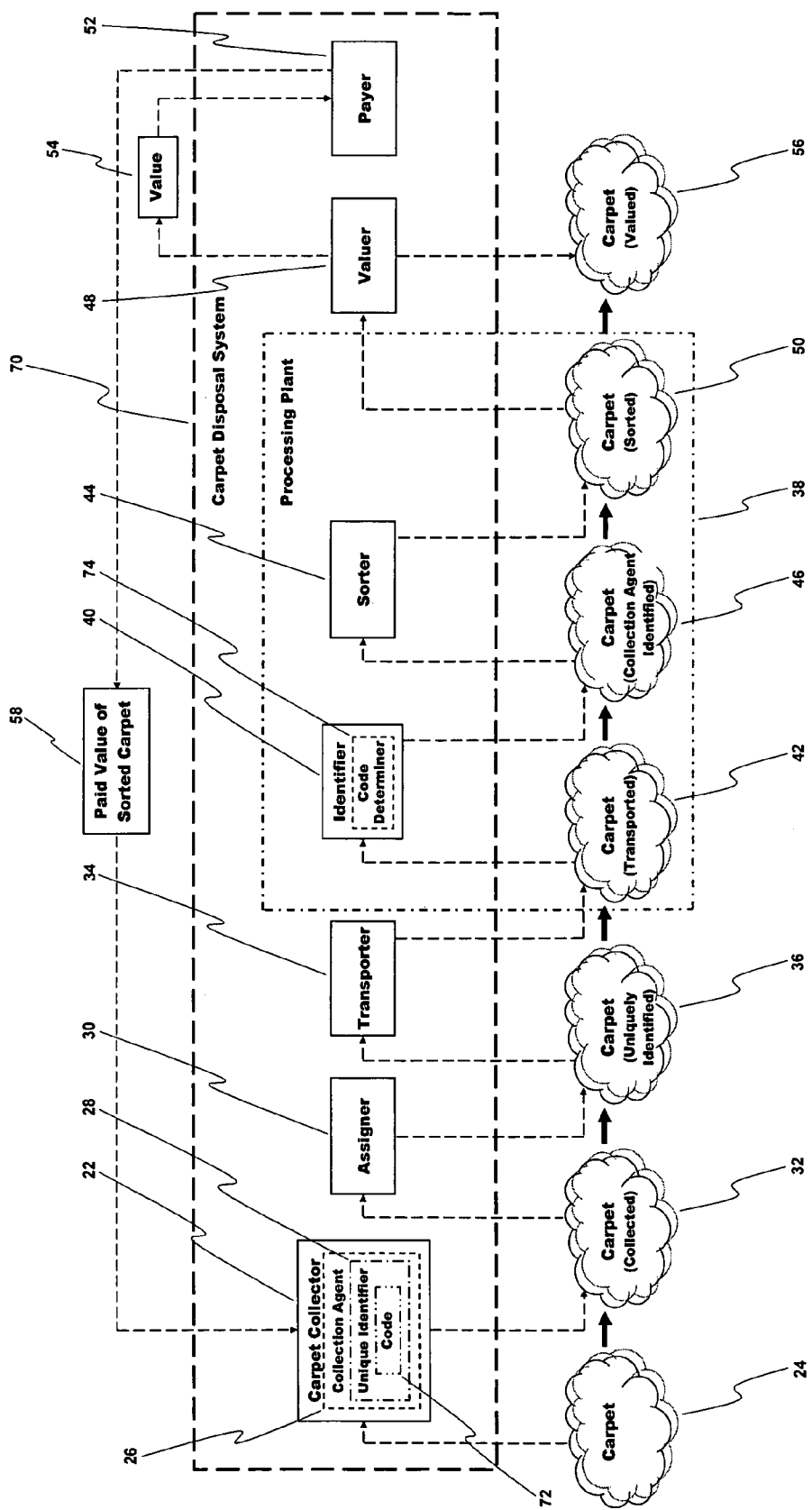
FIG. 4 is a schematic representation of an alternate embodiment of a carpet disposal system of the present invention, comprising a code and a code determiner.

FIG. 4 is a schematic representation of an alternate embodiment of a carpet disposal system (70), which is substantially the same as the carpet disposal system (20), except that the unique identifier (28) of the carpet disposal system (70) comprises a code (72), and the identifier (40) that identifies the collection agent (26) of the uniquely identified (transported) carpet (42) at the processing plant (38) of the carpet disposal system (70) comprises a code determiner (74) that determines the uniquely identified carpet code (72).

Figure 5:
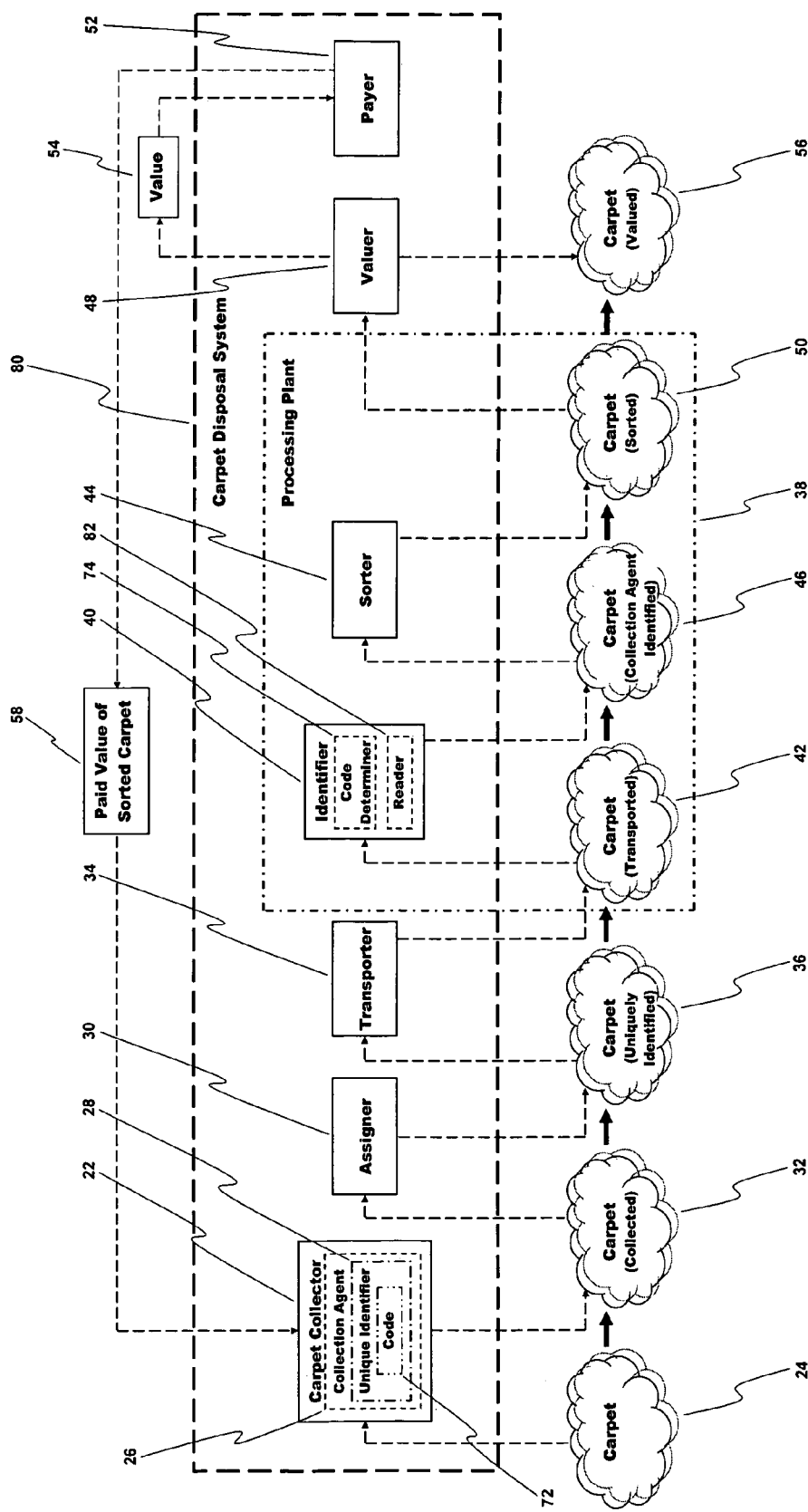
FIG. 5 is a schematic representation of an alternate embodiment of a carpet disposal system of the present invention, comprising a reader.

FIG. 5 is a schematic representation of an alternate embodiment of a carpet disposal system (80), which is substantially the same as the carpet disposal system (70), except that the identifier (40) that identifies the collection agent (26) of the uniquely identified (transported) carpet (42) at the processing plant (38) comprises a reader (82) that identifies the uniquely identified carpet code (72).

Figure 6:
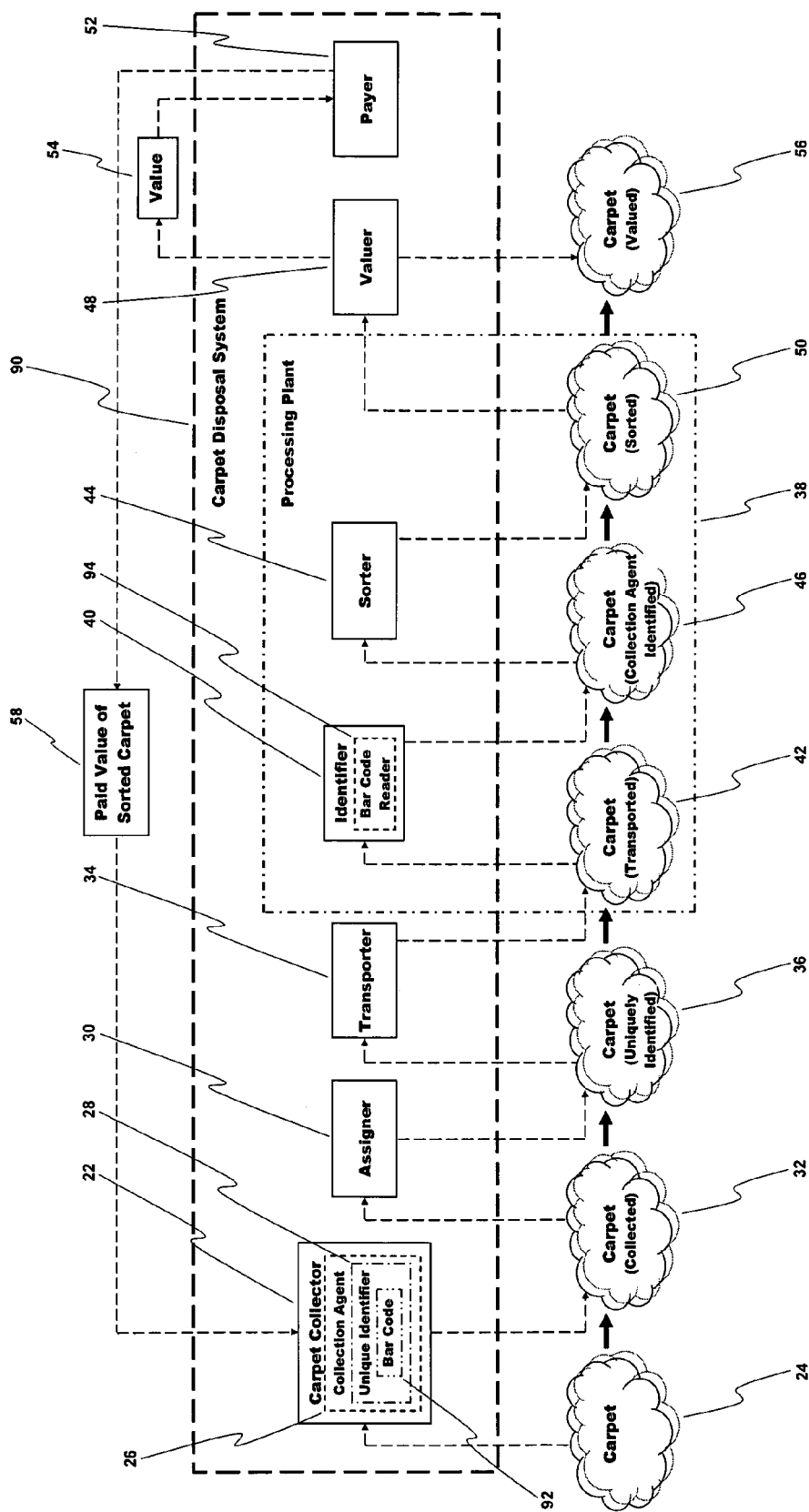
FIG. 6 is a schematic representation of an alternate embodiment of a carpet disposal system of the present invention, comprising a bar code and a reader.

FIG. 6 is a schematic representation of an alternate embodiment of a carpet disposal system (90), which is substantially the same as the carpet disposal system (20), except that the unique identifier (28) of the carpet disposal system (90) comprises a bar code (92), and the identifier (40) that identifies the collection agent (26) of the uniquely identified (transported) carpet (42) at the processing plant (38) of the carpet disposal system (90) comprises a reader (94) that identifies the uniquely identified carpet bar code (92).

Figure 7:
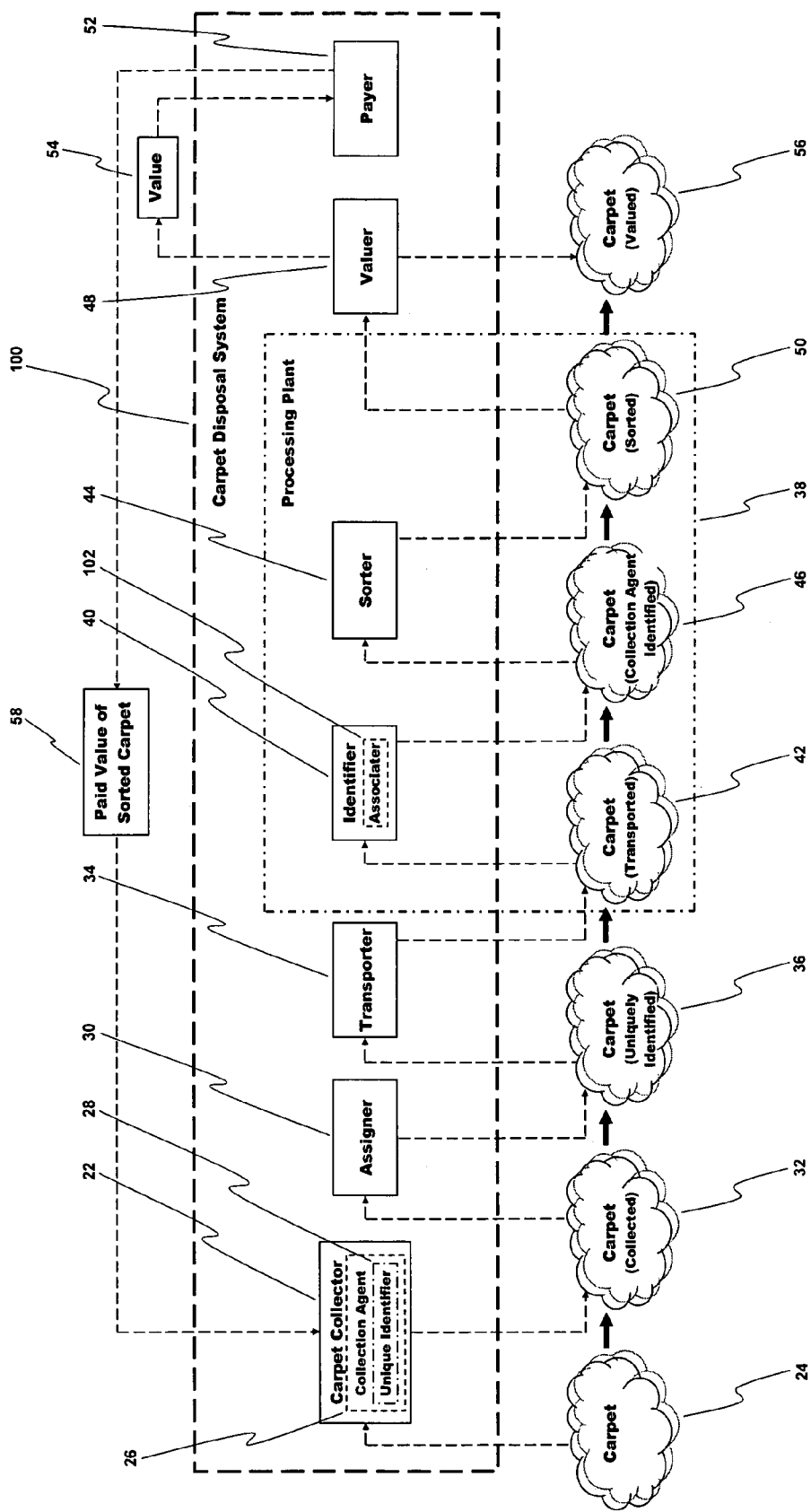
FIG. 7 is a schematic representation of an alternate embodiment of a carpet disposal system of the present invention, comprising an associater.

FIG. 7 is a schematic representation of an alternate embodiment of a carpet disposal system (100), which is substantially the same as the carpet disposal system (20), except that the identifier (40) that identifies the collection agent (26) of the uniquely identified (transported) carpet (42) at the processing plant (38) of the carpet disposal system (100) comprises an associater (102) that associates the uniquely identified (transported) carpet (42) with the identified collection agent (26).

Figure 8:
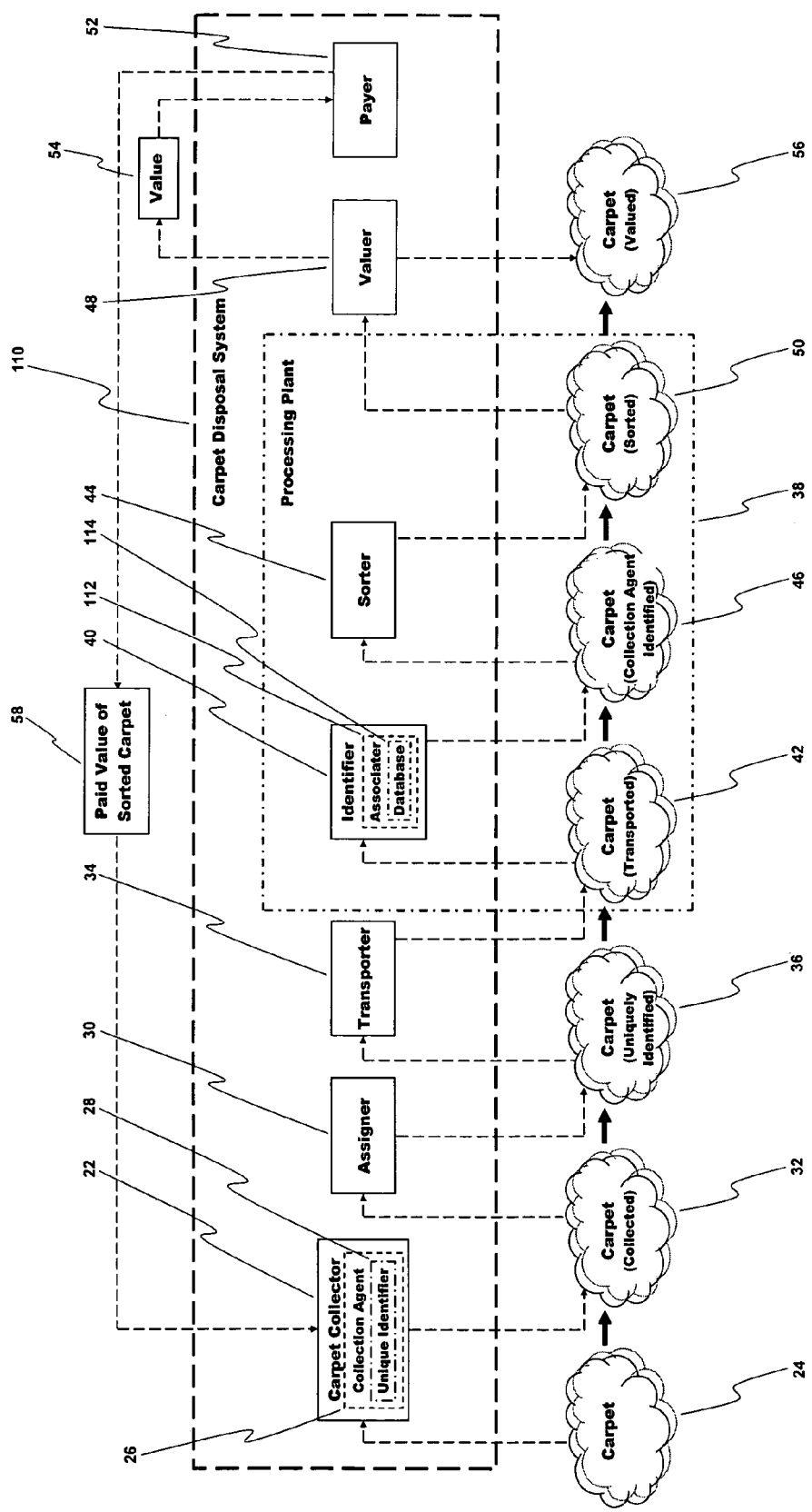
FIG. 8 is a schematic representation of an alternate embodiment of a carpet disposal system of the present invention, comprising an associater comprising a database.

FIG. 8 is a schematic representation of an alternate embodiment of a carpet disposal system (110), which is substantially the same as the carpet disposal system (20), except that the identifier (40) that identifies the collection agent (26) of the uniquely identified (transported) carpet (42) at the processing plant (38) of the carpet disposal system (110) comprises: an associater (112) comprising a database (114), that associates the uniquely identified (transported) carpet (42) with the identified collection agent (26), that determines the identity of the collection agent (26) having the unique identifier (28) assigned to the uniquely identified (transported) carpet (42).

Figure 9:
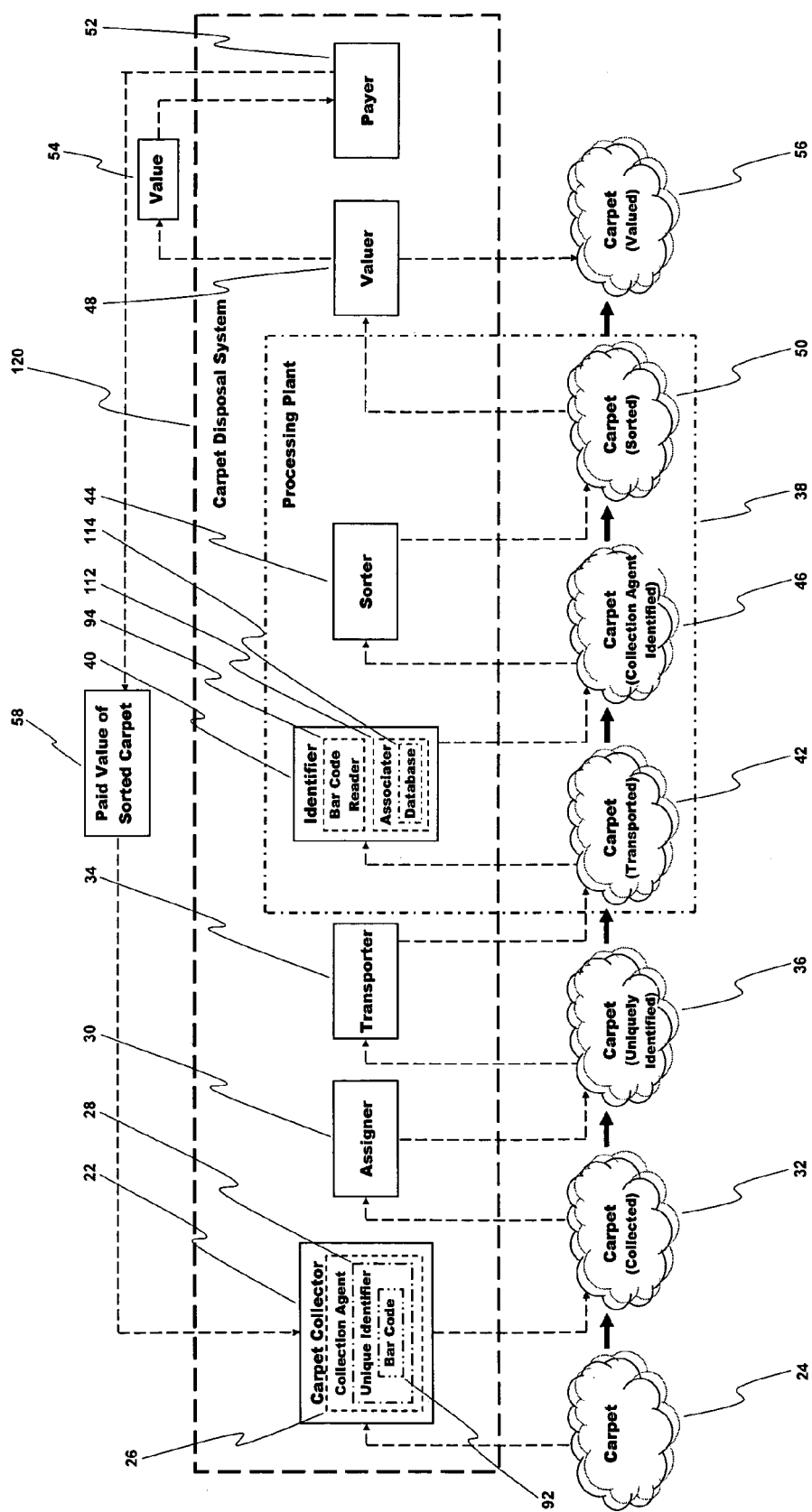
FIG. 9 is a schematic representation of another alternate embodiment of a carpet disposal system of the present invention, comprising an associater comprising a database.

FIG. 9 is a schematic representation of an alternate embodiment of a carpet disposal system (120), which is substantially the same as the carpet disposal system (90), except that the identifier (40) that identifies the collection agent (26) of the uniquely identified (transported) carpet (42) at the processing plant (38) of the carpet disposal system (120) comprises: the associater (112) comprising the database (114), that associates the uniquely identified (transported) carpet bar code (92) with the collection agent (26), that determines the identity of the collection agent (26) having the bar code (92) assigned to the uniquely identified (transported) carpet (42).

Figure 10:
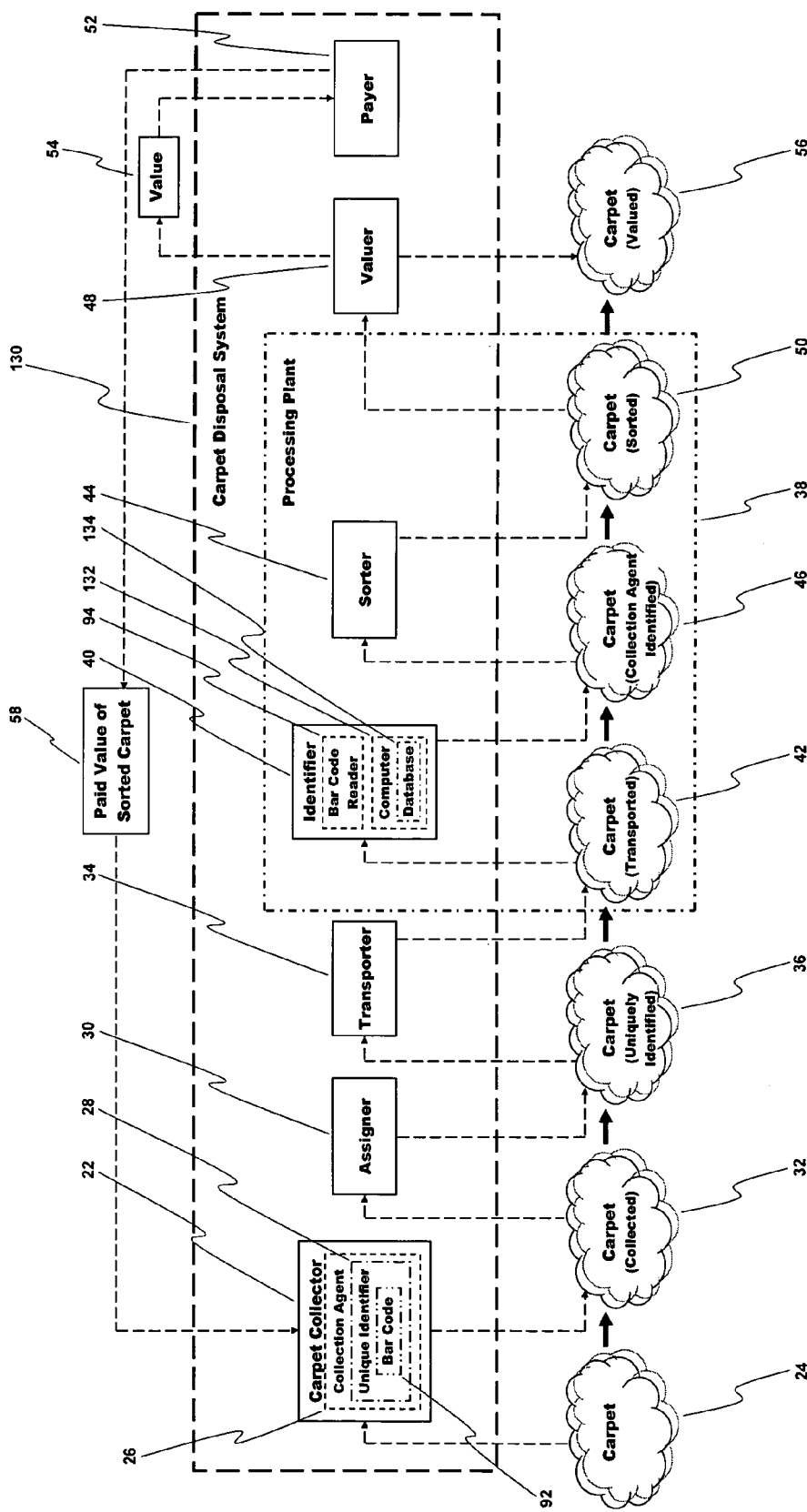
FIG. 10 is a schematic representation of an alternate embodiment of a carpet disposal system of the present invention, comprising a computer comprising a database.

FIG. 10 is a schematic representation of an alternate embodiment of a carpet disposal system (130), which is substantially the same as the carpet disposal system (90), except that the identifier (40) that identifies the collection agent (26) of the uniquely identified (transported) carpet (42) at the processing plant (38) of the carpet disposal system (130) comprises: a computer (132) comprising a database (134), that associates the uniquely identified (transported) carpet bar code (92) with the collection agent (26), that determines the identity of the collection agent (26) having the bar code (92) assigned to the uniquely identified (transported) carpet (42).

Figure 11:
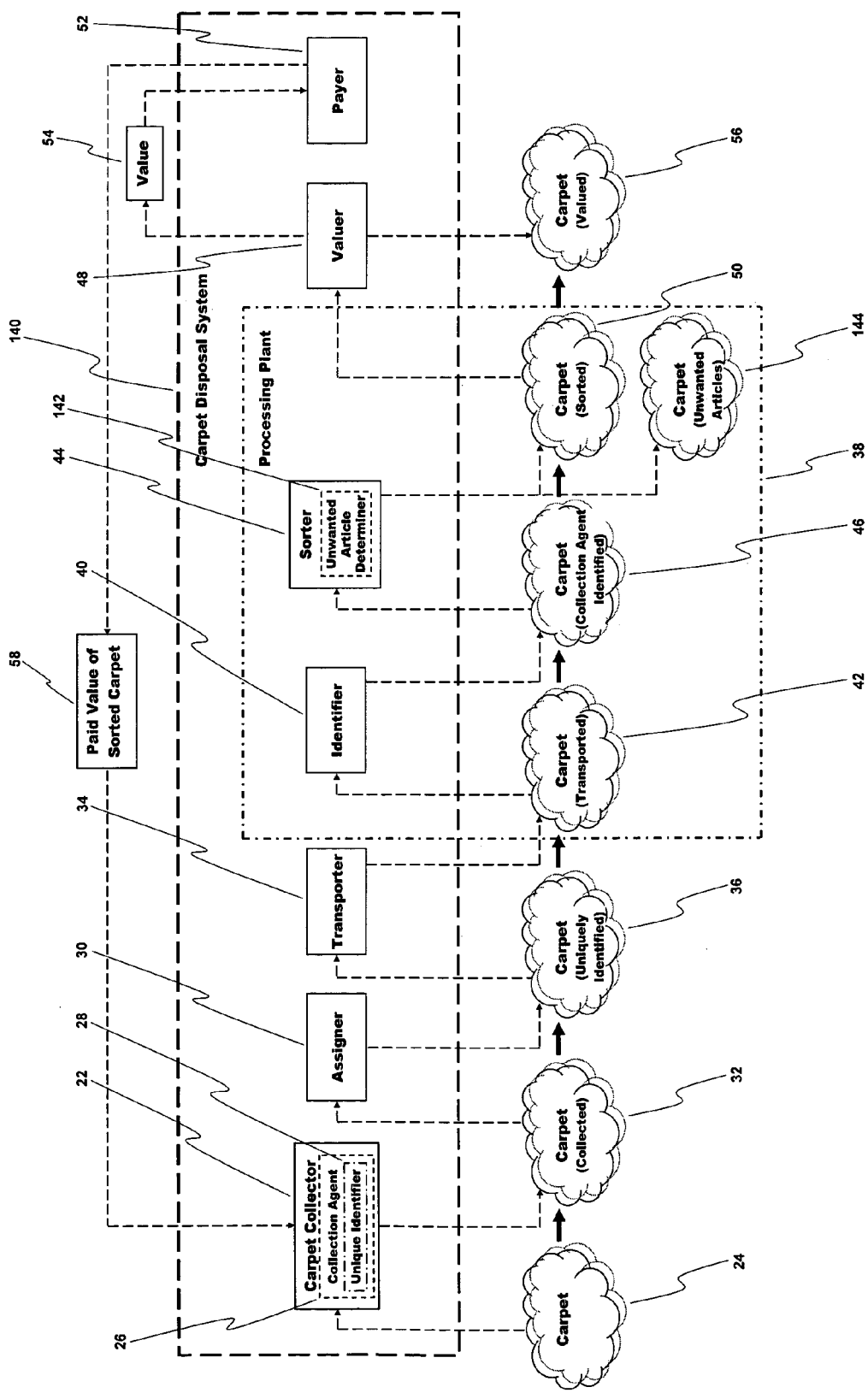
FIG. 11 is a schematic representation of an alternate embodiment of a carpet disposal system of the present invention, comprising an unwanted article determiner.

FIG. 11 is a schematic representation of an alternate embodiment of a carpet disposal system (140), which is substantially the same as the carpet disposal system (20), except that the sorter (44) that sorts the uniquely identified (collection agent identified) carpet (46) of the carpet disposal system (140) further comprises an unwanted article determiner (142) that determines if the uniquely identified (collection agent identified) carpet (46) comprises an unwanted article, and if the uniquely identified (collection agent identified) carpet (46) comprises the unwanted article the sorter (44) sorts the uniquely identified (collection agent identified) carpet (46) comprising the unwanted article into a group of at least one other carpet (144) also comprising the unwanted article.

Figure 12:
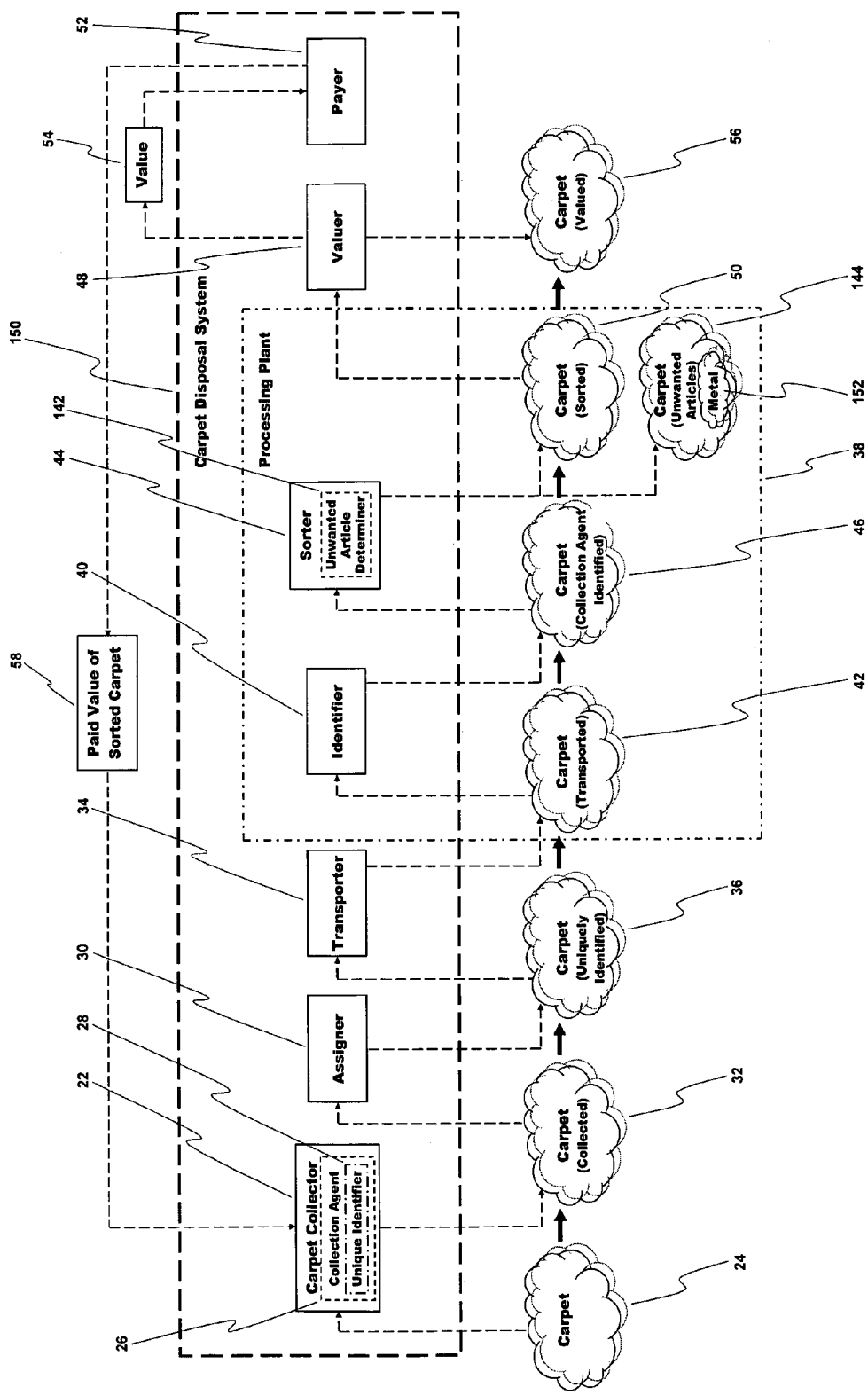
FIG. 12 is a schematic representation of another alternate embodiment of a carpet disposal system of the present invention, comprising an unwanted article determiner.

FIG. 12 is a schematic representation of an alternate embodiment of a carpet disposal system (150), which is substantially the same as the carpet disposal system (140), except that the unwanted article comprises a metal (152).

Figure 13:
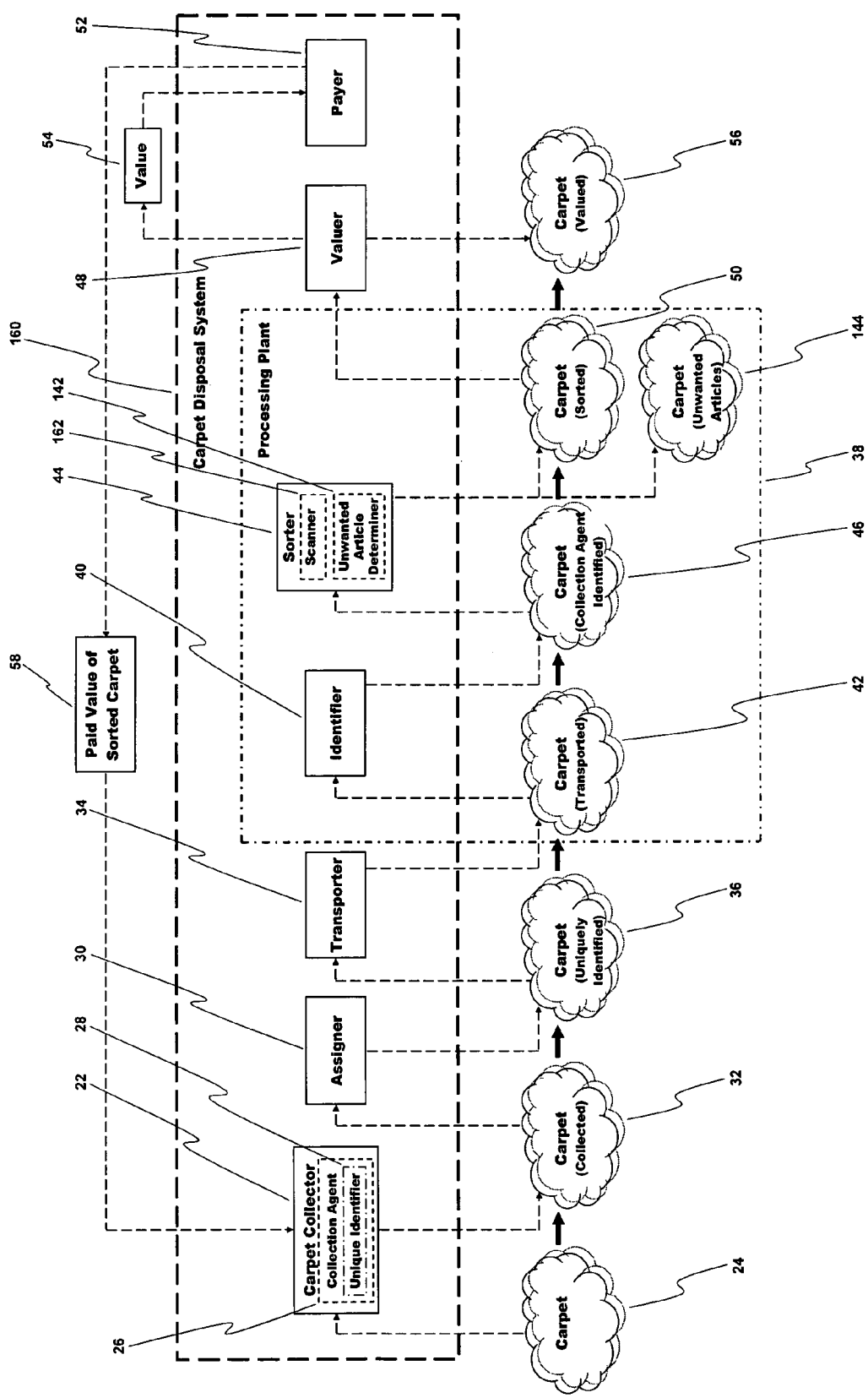
FIG. 13 is a schematic representation of another alternate embodiment of a carpet disposal system of the present invention, comprising an unwanted article determiner.

FIG. 13 is a schematic representation of an alternate embodiment of a carpet disposal system (160), which is substantially the same as the carpet disposal system (20), except that the sorter (44) that sorts the uniquely identified (collection agent identified) carpet (46) of the carpet disposal system (160) further comprises a scanner (162) and the unwanted article determiner (142) that determines if the uniquely identified (collection agent identified) carpet (46) comprises an unwanted article, and if the uniquely identified (collection agent identified) carpet (46) comprises the unwanted article the sorter (44) sorts the uniquely identified (collection agent identified) carpet (46) comprising the unwanted article into the group of at least one other carpet (144) also comprising the unwanted article.

Figure 14:
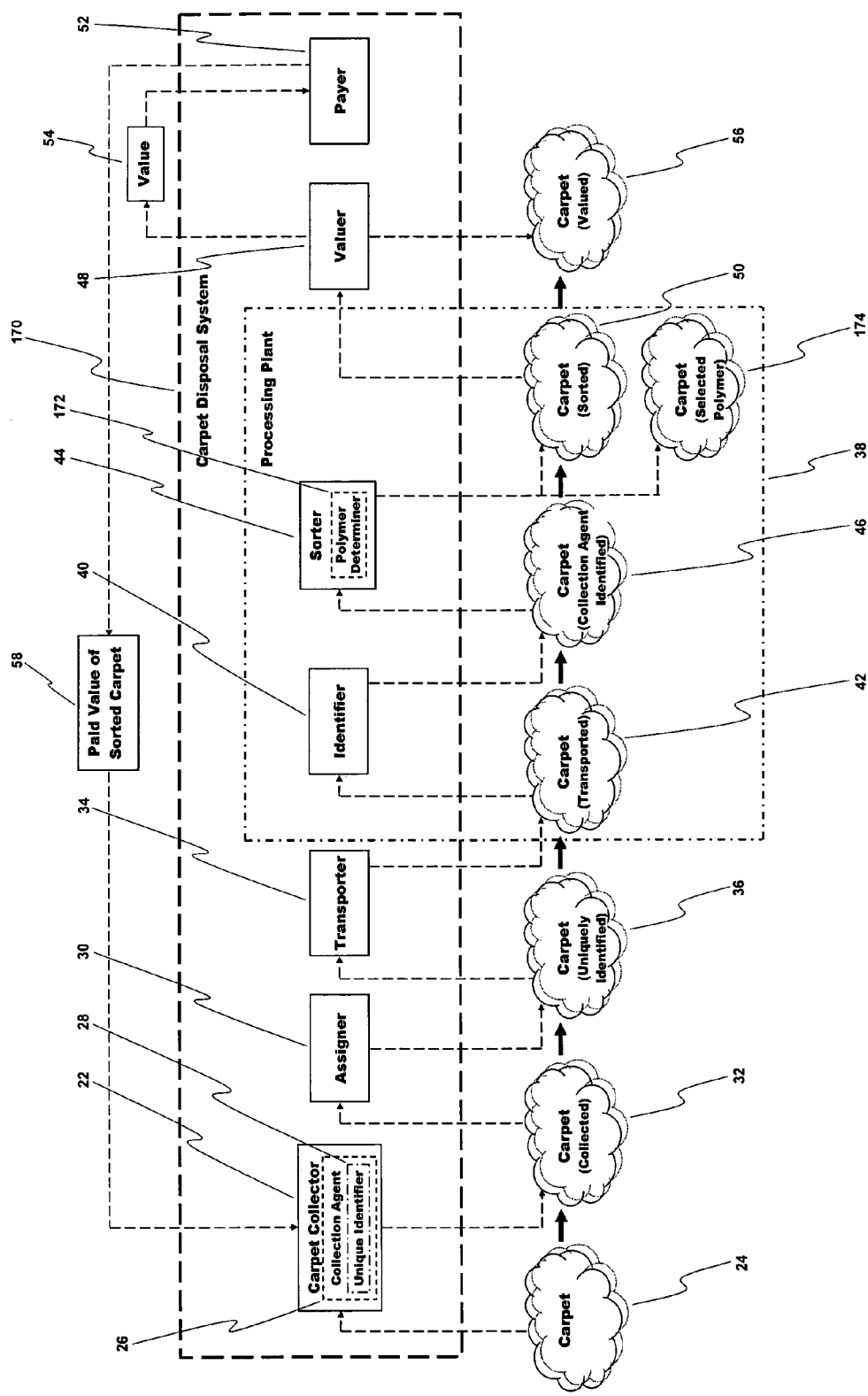
FIG. 14 is a schematic representation of an alternate embodiment of the present invention, comprising a polymer determiner.

FIG. 14 is a schematic representation of an alternate embodiment of a carpet disposal system (170), which is substantially the same as the carpet disposal system (20), except that the sorter (44) that sorts the uniquely identified (collection agent identified) carpet (46) of the carpet disposal system (140) further comprises a polymer determiner (172) that determines if the uniquely identified (collection agent identified) carpet (46) comprises a selected polymer, and if the uniquely identified (collection agent identified) carpet (46) comprises the selected polymer the sorter (44) sorts the uniquely identified (collection agent identified) carpet (46) comprising the selected polymer into a group of at least one other carpet (174) also comprising the selected polymer.

Figure 15:
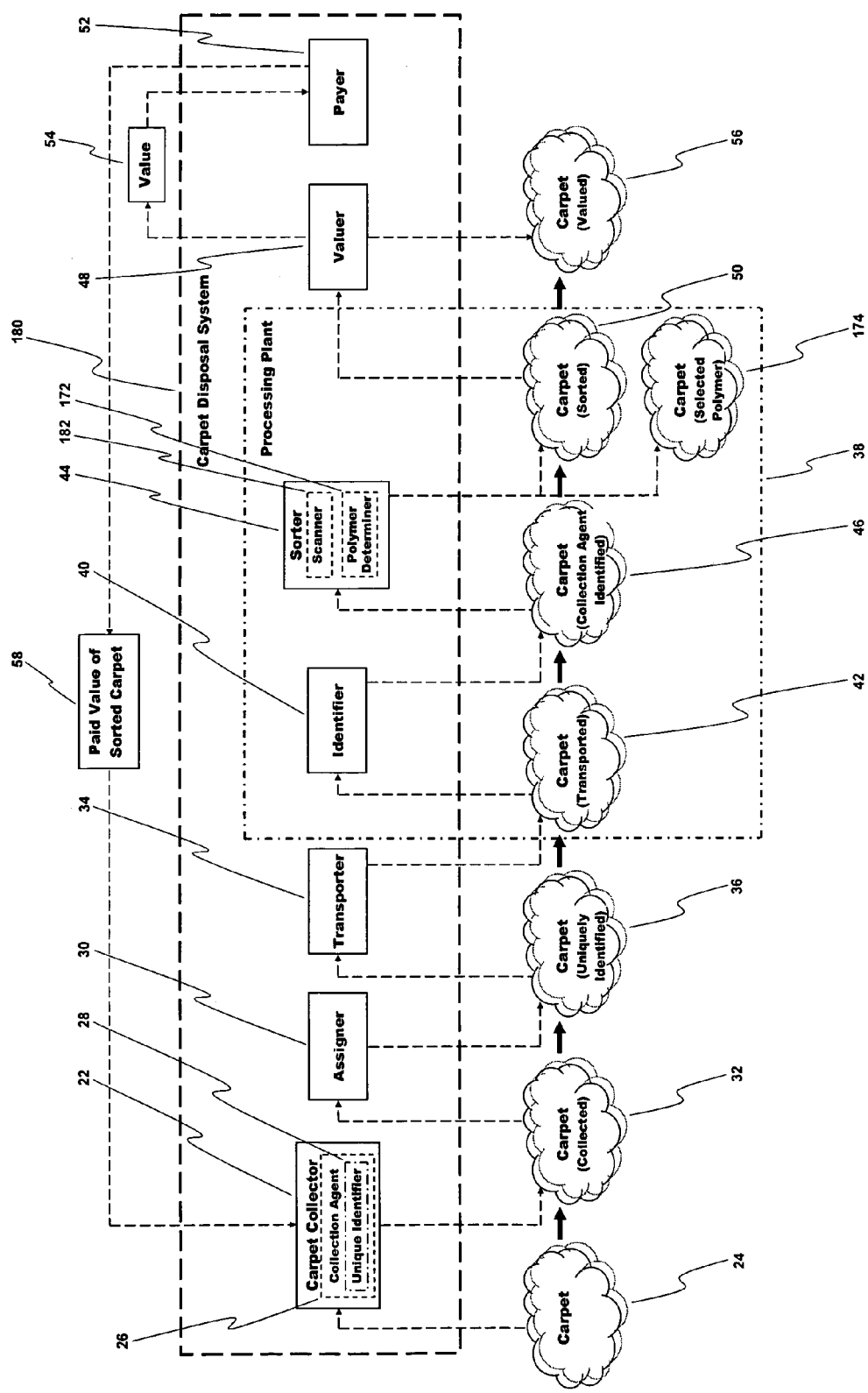
FIG. 15 is a schematic representation of an alternate embodiment of the present invention, comprising a scanner and a polymer determiner.

FIG. 15 is a schematic representation of an alternate embodiment of a carpet disposal system (180), which is substantially the same as the carpet disposal system (20), except that the sorter (44) that sorts the uniquely identified (collection agent identified) carpet (46) of the carpet disposal system (180) further comprises a scanner (182) and the polymer determiner (172) that determines if the uniquely identified (collection agent identified) carpet (46) comprises a selected polymer, and if the uniquely identified (collection agent identified) carpet (46) comprises the selected polymer the sorter (44) sorts the uniquely identified (collection agent identified) carpet (46) comprising the selected polymer into a group of at least one other carpet (174) also comprising the selected polymer.

Figure 16:
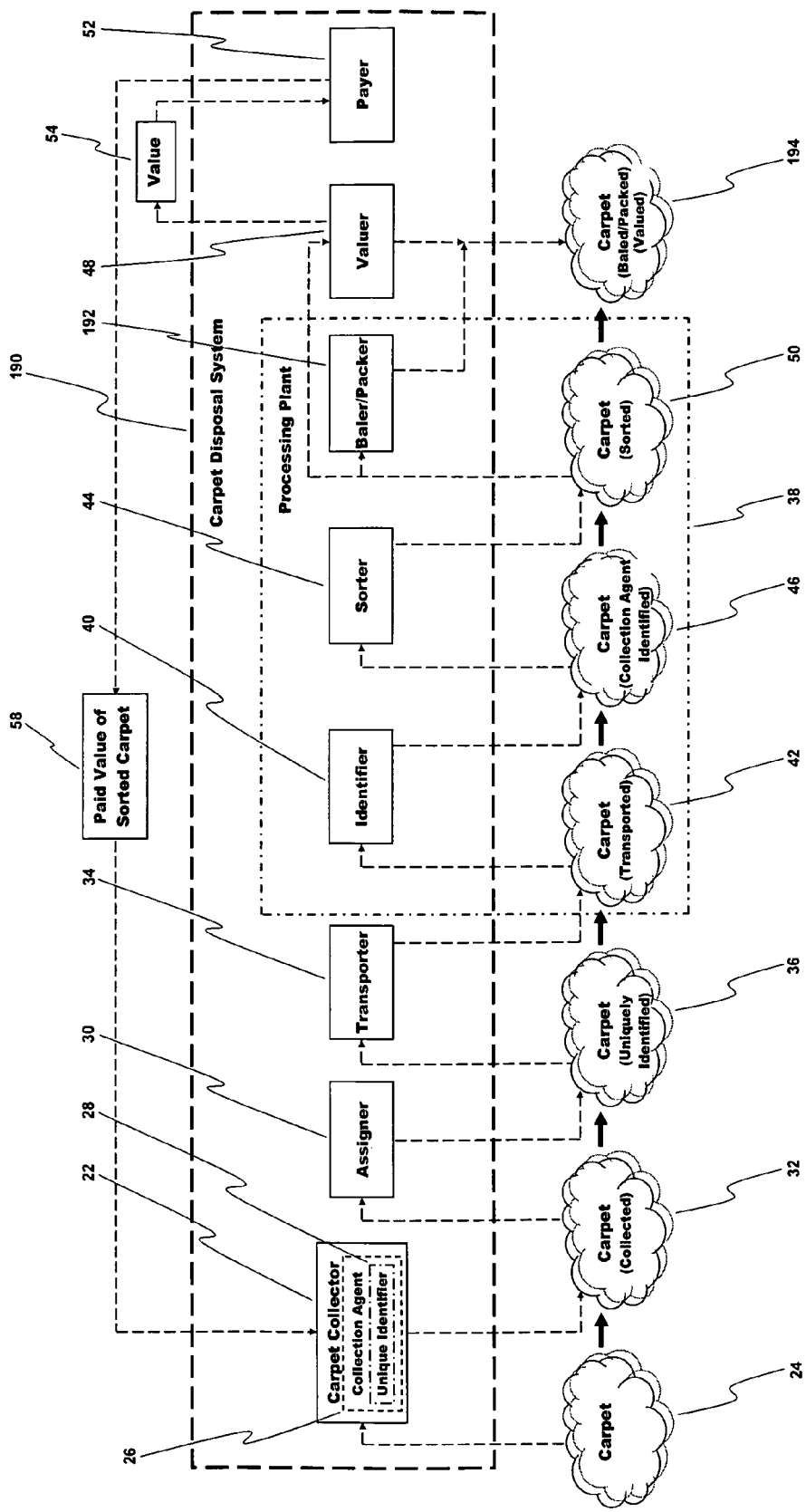
FIG. 16 is a schematic representation of an alternate embodiment of a the present invention, comprising a baler.

FIG. 16 is a schematic representation of an alternate embodiment of a carpet disposal system (190), which is substantially the same as the carpet disposal system (20), except that the carpet disposal system (190) further comprises a baler and/or packer (192) that bales and/or packs the sorted carpet (50). The baled and/or packed and valued carpet (194) is also shown in FIG. 16.

Figure 17:
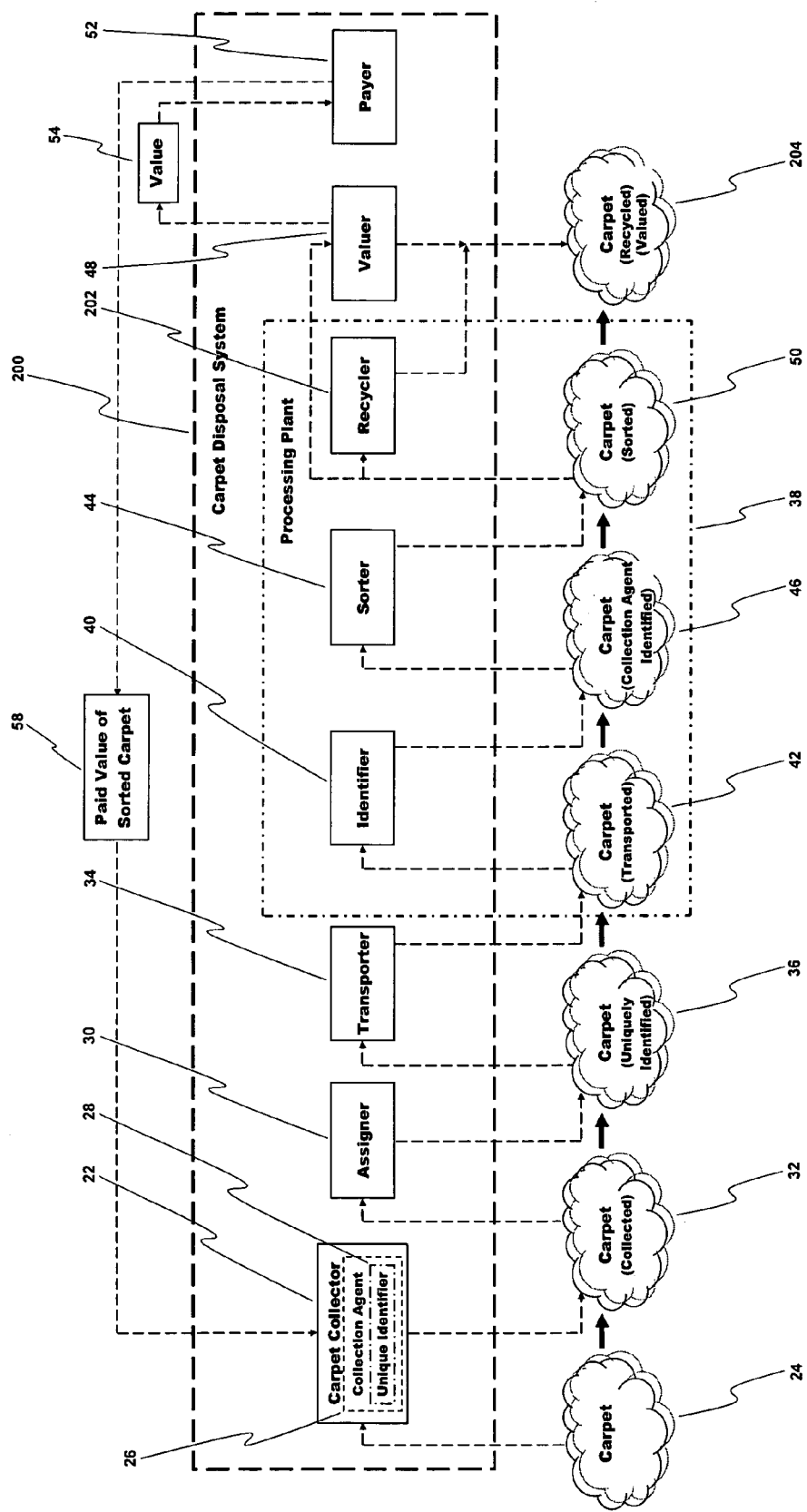
FIG. 17 is a schematic representation of an alternate embodiment of a carpet disposal system of the present invention, comprising a recycler.

FIG. 17 is a schematic representation of an alternate embodiment of a carpet disposal system (200), which is substantially the same as the carpet disposal system (20), except that the carpet disposal system (200) further comprises a recycler (202) that recycles the sorted carpet (50). The recycled and valued carpet (204) is also shown in FIG. 17.

Figure 18:
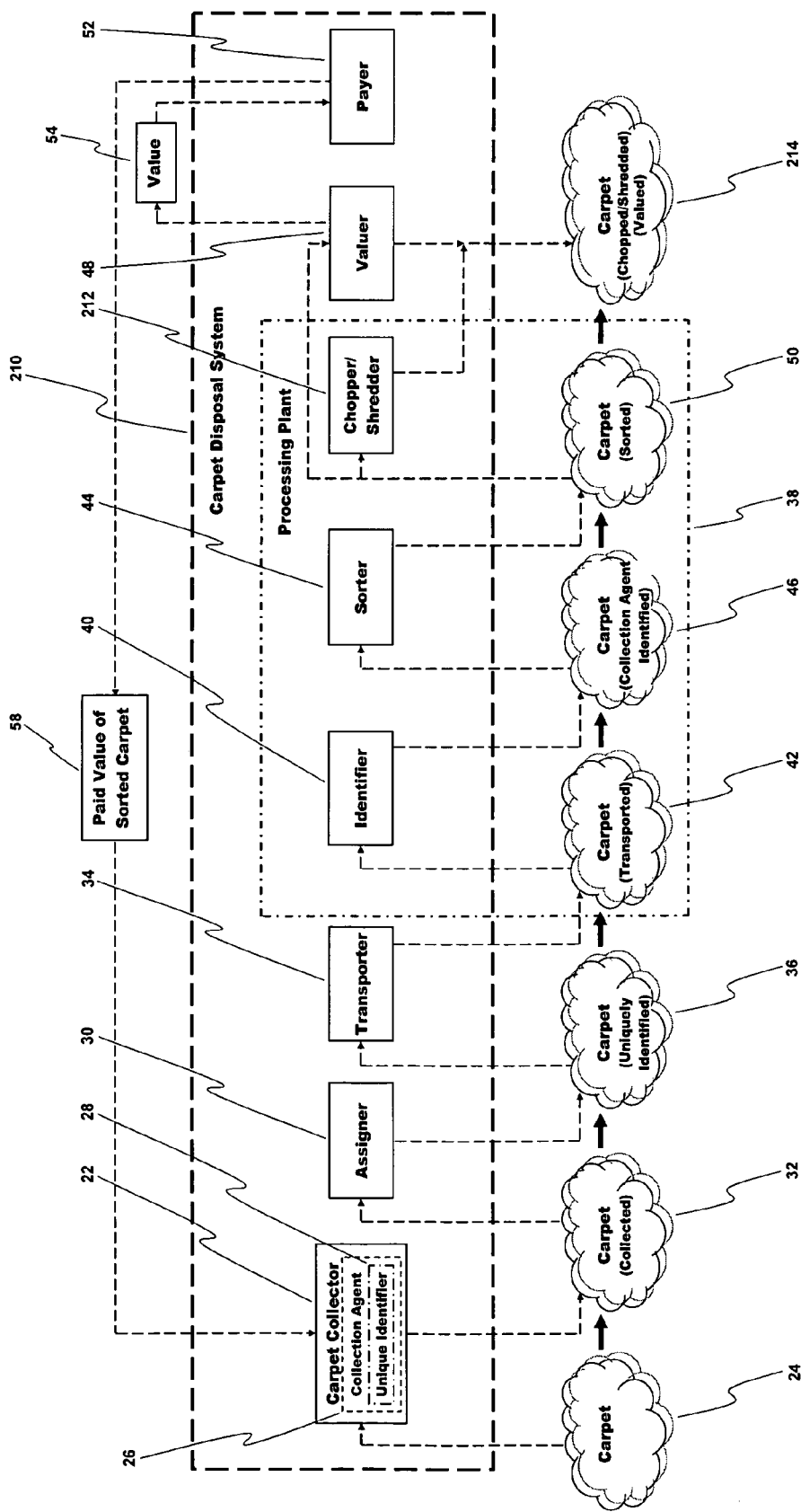
FIG. 18 is a schematic representation of an alternate embodiment of the present invention, comprising a chopper and/or shredder.

FIG. 18 is a schematic representation of an alternate embodiment of a carpet disposal system (210), which is substantially the same as the carpet disposal system (20), except that the carpet disposal system (210) further comprises a chopper and/or shredder (212) that chops and/or shreds the sorted carpet (50). The chopped and/or shredded and valued carpet (194) is also shown in FIG. 18.

Figure 19:
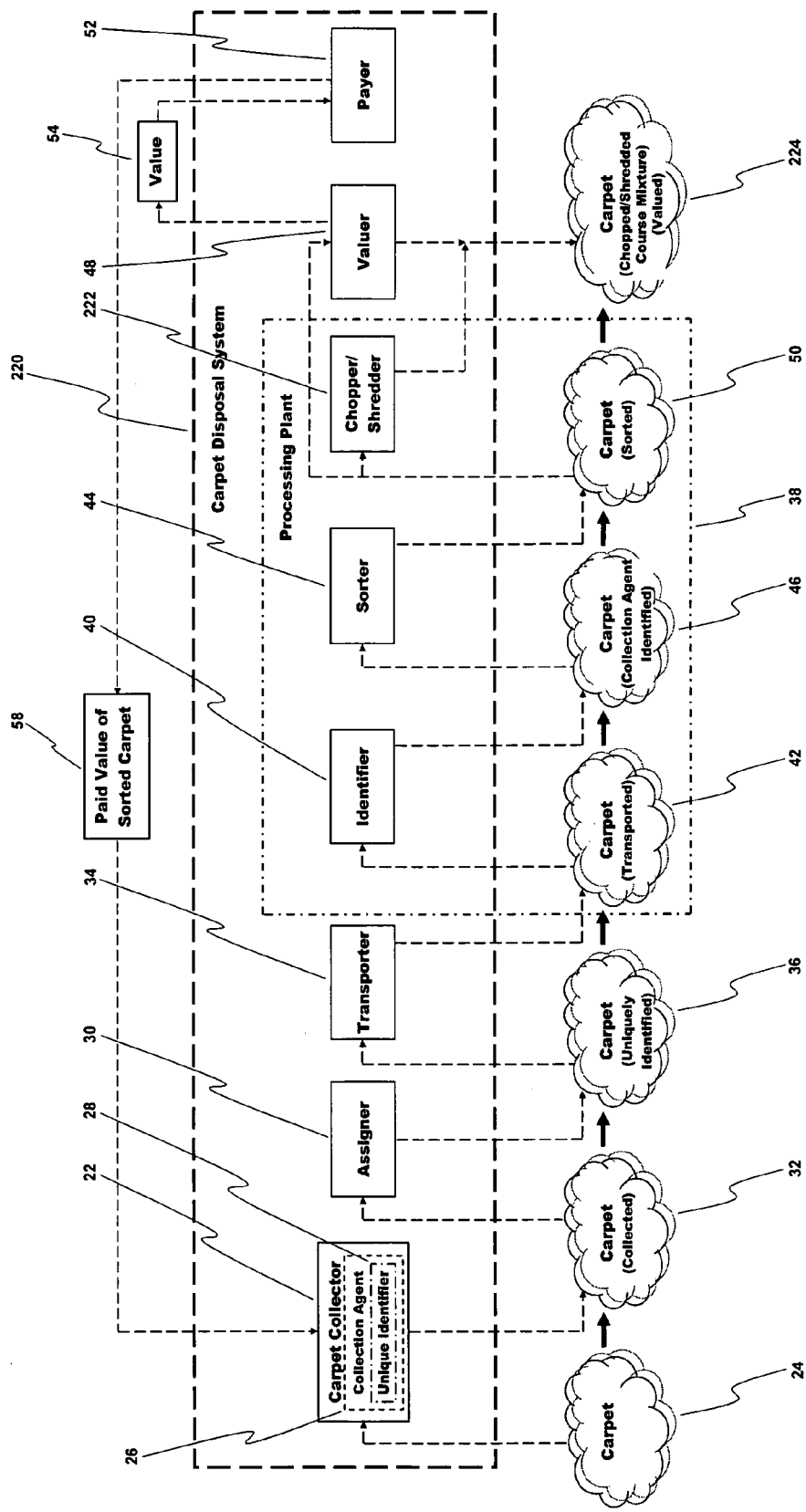
FIG. 19 is a schematic representation of another alternate embodiment of the present invention, comprising a chopper and/or shredder.

FIG. 19 is a schematic representation of an alternate embodiment of a carpet disposal system (220), which is substantially the same as the carpet disposal system (20), except that the carpet disposal system (220) further comprises a chopper and/or shredder (222) that chops and/or shreds the sorted carpet (50) into a coarse mixture. The chopped and/or shredded coarse mixture and valued carpet (224) is also shown in FIG. 19.

Figure 20:
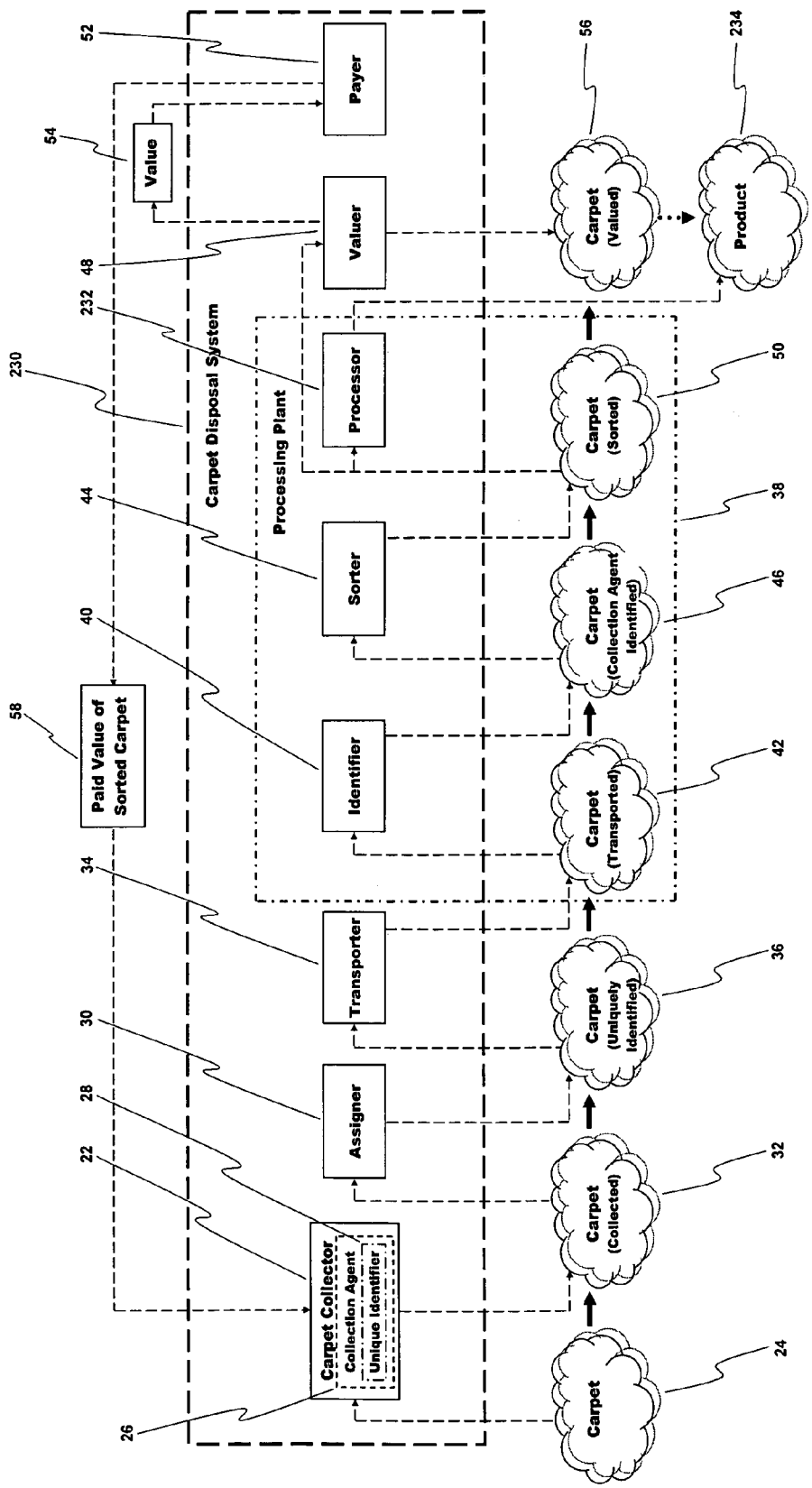
FIG. 20 is a schematic representation of an alternate embodiment of the present invention, comprising a processor.

FIG. 20 is a schematic representation of an alternate embodiment of a carpet disposal system (230), which is substantially the same as the carpet disposal system (20), except that the carpet disposal system (230) further comprises a processor (232) that processes the sorted carpet (50) into a product (234).

Figure 21:
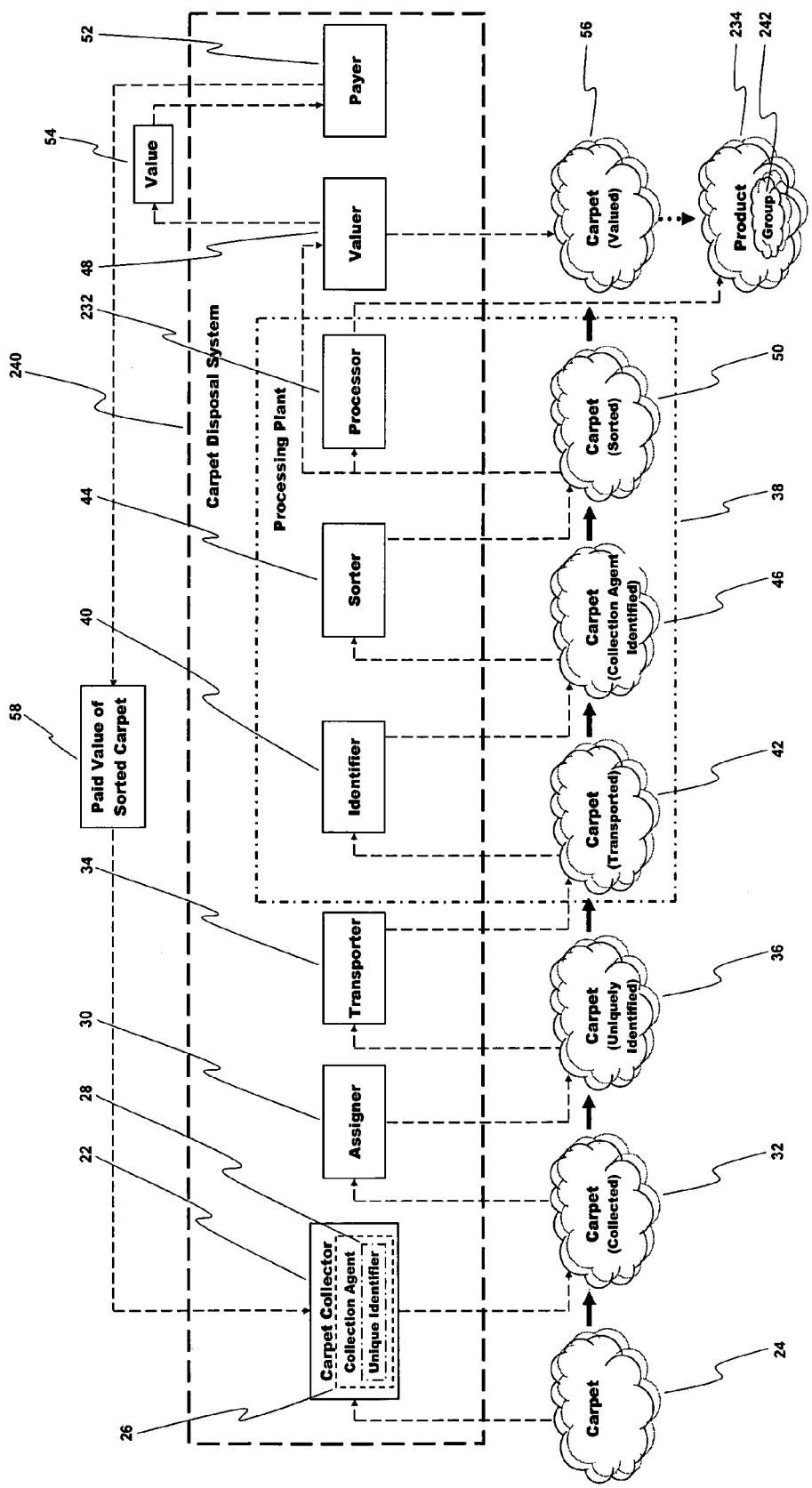
FIG. 21 is a schematic representation of another alternate embodiment of the present invention, comprising a processor.

FIG. 21 is a schematic representation of an alternate embodiment of a carpet disposal system (240), which is substantially the same as the carpet disposal system (230), except that the product (234) is from the group (242) consisting of: needle-punched fiber mat, sheet material, fiber, nylon fiber, or pelletized material.

Figure 22:
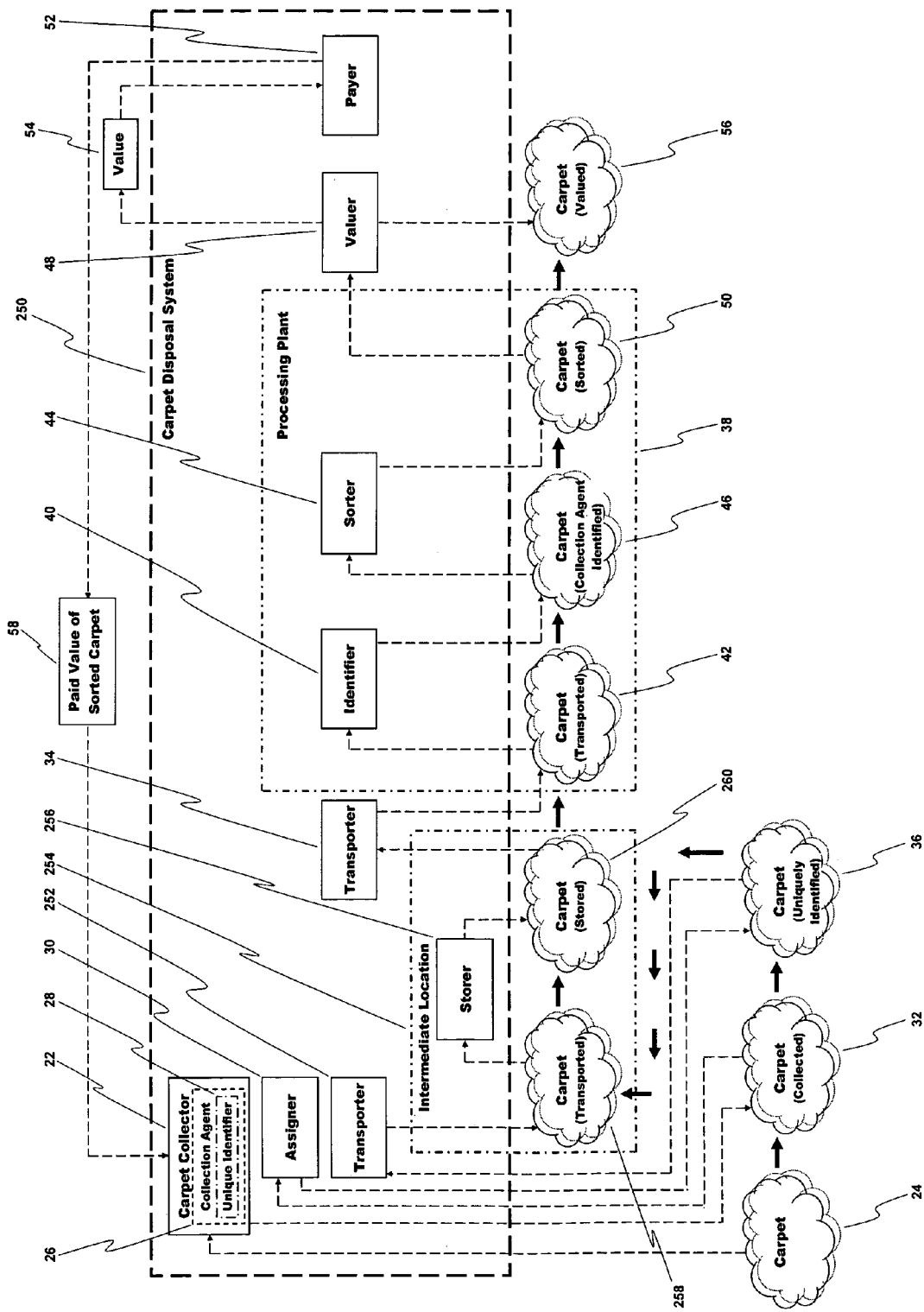
FIG. 22 is a schematic representation of an alternate embodiment of the present invention, comprising a storer.

FIG. 22 is a schematic representation of an alternate embodiment of a carpet disposal system (250), which is substantially the same as the carpet disposal system (20), except that the carpet disposal system (250) further comprises: a transporter (252) that transports the uniquely identified carpet (36) to an intermediate location (254); and a storer (256) that stores the uniquely identified (transported) carpet (258) at the intermediate location (254); the transportation and the storage at the intermediate location (254) being performed prior to the transportation to the processing plant (38). The stored carpet (260) at the intermediate location (254) is also shown in FIG. 22.

Figure 23:
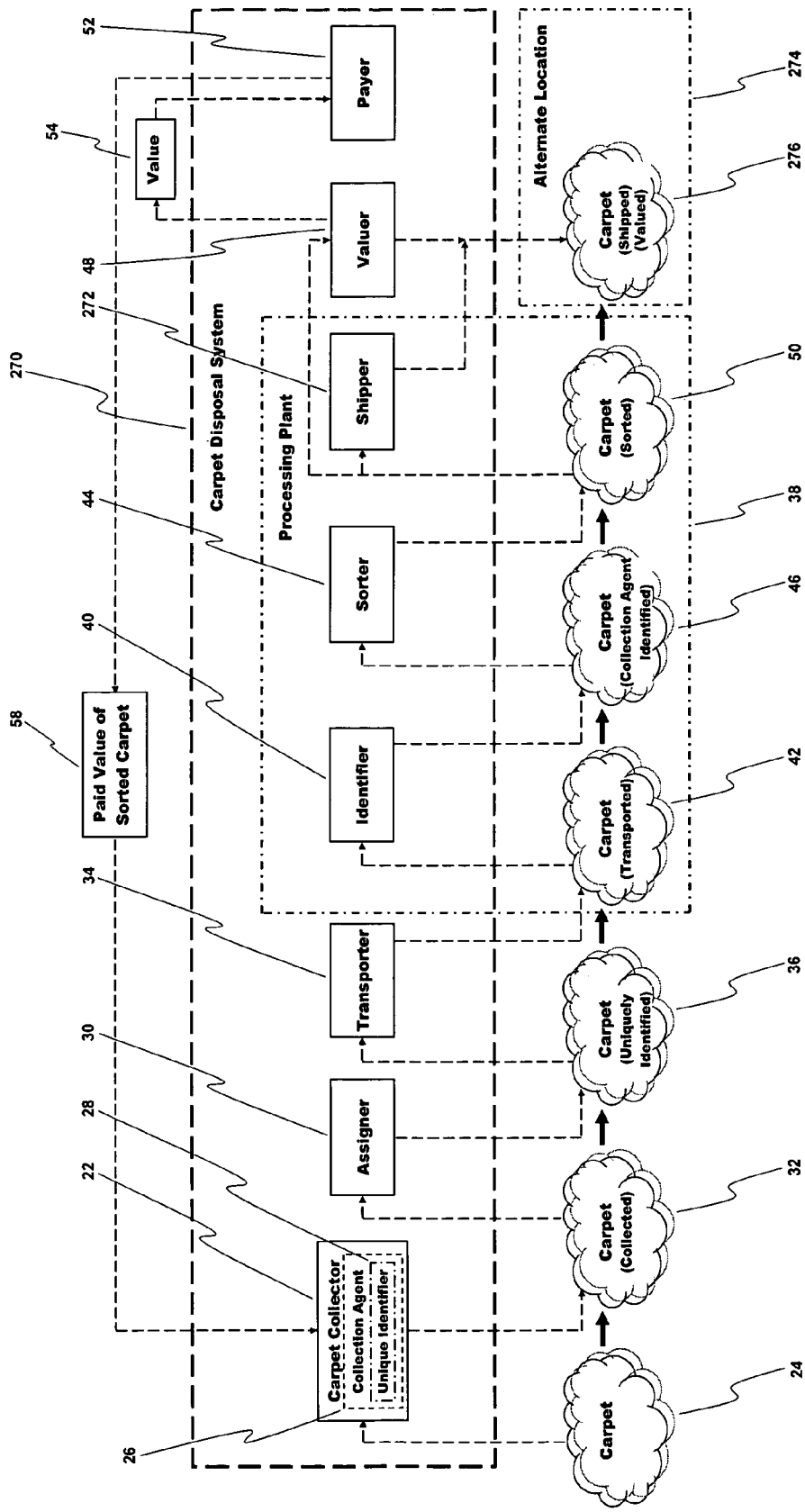
FIG. 23 is a schematic representation of an alternate embodiment of the present invention comprising a shipper.

FIG. 23 is a schematic representation of an alternate embodiment of a carpet disposal system (270), which is substantially the same as the carpet disposal system (20), except that the carpet disposal system (270) further comprises a shipper (272) that ships the sorted carpet (50) from the processing plant (38) to an alternate location (274). The shipped and valued carpet (276) is also shown in FIG. 23.

Trailer Boxes for Local Collections

A preferred type of collection box will be the type of standard closed-box trailers that are used by the thousands for hauling freight on highways. A typical trailer box of this type is 53 feet long, and has eight wheels on two axles in the rear. A standard towing coupler in the front allows the trailer box to be coupled ("hitched") securely to a conventional diesel tractor, for towing, thereby forming the standard "18-wheeler" tractor-trailer combination. Trailer boxes of this sort are designed and built to withstand rain and other adverse weather without rusting or other substantial deterioration, so an empty trailer box can be hauled to a parking lot, unhitched from the tractor, and left to stand for weeks or months in the parking lot as it gradually fills with rolls of discarded carpet.

Any such trailer box is conventionally built with a door in the rear, with a latching mechanism to allow the box to be securely locked, to reduce the risk of theft of the cargo. Some trailer boxes of this type also have side doors and other options, but those options typically will not be necessary for use as disclosed herein.

When used for carpet collection purposes, these trailer boxes typically will be kept locked at all times except for a daily period on Mondays through Saturdays that will coincide with typical quitting times for carpet installers; in general, the unlocked span of time for most locations should be centered on the time between about 3 pm and about 6 pm.

If desired, accommodations (such as hinged insertion doors in a trailer wall, nearby dumpsters with lids to keep out rain, locks that can be opened by companies that need extra help, etc.) also can be provided, to allow carpet drop-offs at other hours. Because of the very low value of dirty and discarded post-consumer carpet to anyone who is not participating in this system, expensive security measures generally will not be required.

When a trailer box is reasonably full of discarded carpet, a diesel tractor will be driven to the site and hitched to the trailer. To avoid the need for a second trip to return an unloaded trailer box back to its loading spot, a tractor normally will tow out an empty box to a collection location, and leave behind the empty box when it tows away the full box.

The tractor will then haul the loaded trailer box to a centralized receiving facility. It is anticipated that one receiving facility will be located in or near most cities or counties, and that large urban areas may have more than one receiving facility.

Categories of Receiving Facilities

A post-consumer carpet receiving facility as disclosed herein will generally fall into one of three categories, depending on how many operations are carried out at that facility.

The smallest type of receiving facility is referred to herein as a "scanning and sorting" facility. It will do little more than scanning and sorting rolls of discarded carpet into different treatment groups. The sorted rolls can be baled or packed into shipping containers, for transport to other locations where subsequent operations can be carried out. If desired, these types of receiving facilities can chop pre-sorted rolls into segments, or carry out any other desired type of operation, to reduce transportation or other costs. Even this smallest type of receiving facility will be able to identify and isolate carpet rolls that do not have sufficient quality to merit recycling through reuse of the fibers. Accordingly, low-quality rolls can be diverted to other destinations; as one example, they can be sent to cement kilns, where they will be burned as fuel.

The next larger size of receiving facility is referred to herein as a "sorting and shredding" facility. This type of facility will have scanning and sorting capability, and it will also have chopping and shredding machines, which can be used to shred rolls of carpet into a coarse and uncombed mixture referred to herein as "shredded yarn". This type of shredded yarn material can be baled, stuffed into large shipping bags or containers, or otherwise prepared in any suitable manner for transport to a location that has manufacturing equipment which will process the shredded yarn into a completed salable product.

The third category of receiving facility is referred to herein as a manufacturing facility. In addition to having scanning, sorting, chopping, and shredding machines, it also will have (at that same location) the types of large machines and equipment that will be used to process shredded yarn into salable output products. Examples of salable output products include but are not limited to:

(i) needle-punched fiber mats, which can be used as high-quality carpet padding beneath newly-laid carpet in high-traffic locations, such as retail stores and offices;

(ii) sheet materials that can function as water-resistant substitutes for plywood and particle boards, as described in PCT patent application WO 01/76869;

(iii) nylon fibers that are bagged in pre-measured quantities in water-soluble bags, which can be added to materials such as concrete that is being mixed, to add reinforcing fibers to the concrete; and, (iv) pelletized or similar materials that can be used as feedstock for injection molding or other similar operations.

The eventual number and placement of each of these three categories of receiving facilities across a country will be determined by economics and licensing deals, rather than by technical factors. Clearly, to expand any receiving facility into a larger facility that can carry out more operations will require higher up-front investment expenses; however, those initial investments will lead to substantially lower ongoing costs for operations such as baling, transportation unfinished intermediates to different facilities, etc. Accordingly, the placement of shredding and/or manufacturing machines in some but not all receiving facilities will be based on financial, geographic, and demographic rather than technical factors, and those matters do not need to be addressed in this patent application.

Accordingly, it should be understood that this invention relates to the machines and equipment that will be used to collect, scan, and sort post-consumer carpet. It is not necessary to specify what will be done with any batch of post-consumer carpet after those steps have been completed at a receiving facility; instead, it merely needs to be recognized that various useful recycling options have been developed to date, and other recycling options are continuing to be researched and developed.

In general, the Applicant herein anticipates that a substantial number of receiving facilities will be distributed across a nation such as the United States. It is generally anticipated that when a post-consumer carpet collection operation as described herein approaches maturity throughout the U.S., there will be some sort of receiving facility in or near almost all of the roughly 30 to 100 largest cities in the U.S. Presumably, most of these facilities will be located near the outskirts of a city, or in a blighted and economically depressed urban area. Several dozen more receiving facilities are likely to be scattered across the country, to serve large rural areas that are not close to large cities. All of these will have scanning and sorting capability, and some are also likely to have chopping machines, but no shredding machines. Some of these receiving facilities will have shredding machines, and some will also have full manufacturing capability.

Unloading, Scanning, and Sorting at a Receiving Facility

At any receiving facility, an unloading dock must be provided in a manner that will simplify and facilitate unloading operations. This normally is done by well-known steps, which include: (i) making sure that 18-wheeler tractor-trailer combinations have enough room to maneuver and back up properly to the unloading dock; (ii) ensuring that the floor of the unloading dock is at the same height as the floors of standard trailer boxes, to minimize any lifting requirements; and, (iii) providing an extendible plastic rain shield at the doorway, which can be extended during rain or snow to keep the workers and carpet segments dry during an unloading operation.

When a loaded trailer box is backed up to the doorway of a loading dock, the discarded rolls of carpet in the truck will be unloaded from the truck, and loaded onto a large conveyor belt or similar system within that receiving facility. This unloading operation can be done using any combination of manual labor, mechanical devices, and powered equipment. As one example, a forklift can be used to unload carpet segments, especially if pallet-type structures were placed in the trailer box before it was taken to a parking lot to be loading with discarded carpet rolls.

As another example, an extendible railing device which supports a travelling pulley with grappling hooks can be provided at the loading dock, to provide grappling hooks that can lift hundreds of pounds of carpet at a time and carry the carpet out of the trailer box and over the conveyor system; to provide greater stability, this type of rail-and-pulley system can use a travelling counterweight that will remain in the loading dock, or it can use any suitable type of end attachment that can be affixed to a hanging cable or chain, support bracket, or similar device that has been welded or bolted into the trailer box near its front end.

As a third example, a movable platform or conveyor belt can be installed in the floor of a trailer box. During an unloading operation, this type of platform or conveyor can be driven by a hand-powered winch, an electric motor, a gearing or hydraulic device, or any other suitable unit that will cause the platform or conveyor to move the load of carpet out the door of the trailer box and onto a conveyor or other handling system.

As yet another example, a power-driven scaffolding jack can be installed in the front of the trailer box. When a gear drive, hydraulic hose, or similar powering system (provided by the loading dock) is coupled to the device, the scaffold will begin extending, causing it to push all of the carpet rolls in the trailer box toward and out of the open rear door of the trailer box. As the carpet rolls are shoved out of the trailer box, they will be pushed onto a large work table or conveyor system, where workers will move or adjust them as necessary to make sure they are resting properly on a conveyor system that will carry them past the scanning equipment.

As still another example, the loading dock can be provided with a telescoping or other movable conveyor system. This type of system can allow the end of the conveyor to be gradually inserted deeper into the trailer box as the box is unloaded. This will allow workers to push and shove carpet rolls onto the tip of the conveyor, which will generally remain alongside them as they unload the box and work their way toward its front end.

Once the carpet rolls have been distributed onto the conveyor system, the bar-coded tags will be scanned and recorded on a computer, preferably in conjunction with a device that will weigh the carpet rolls (or clusters of rolls).

Each roll then also be passed through or in front of a scanning device, such as an x-ray machine and/or metal detector, to ensure that it does not contain metallic or other unwanted components which might (i) damage or entangle any machines that will be used to process the carpet rolls, or (ii) lead to defects in the final output product obtained from the operation. Preferably, an automated or semi-automated rejection system can be used in conjunction with the scanning device, to allow potentially dangerous or problematic rolls to be diverted into a separate collection or handling system. In this type of "reject bin," rejected or diverted rolls can be opened, if desired, for inspection and removal of any metal, debris, or other unwanted material; alternately, they can be loaded into a shipping container that will deliver them to a cement kiln, for burning.

If desired, rolls of discarded carpet can also be passed through or in front of any of several types of scanning devices that can be used to distinguish between different types of polymers used in carpet fibers. As examples, certain known types of infra-red scanners and laser scanners can be used to distinguish between carpet rolls containing nylon-6 fibers, and carpet rolls containing nylon-6,6 fibers. This distinction is important, for some but not all types of recycling uses. In general, nylon-6 fibers must be separated from nylon-6,6 fibers for most types of chemical treatment (such as recovery of the caprolactam monomers that form the building blocks of nylon-6); however, fiber separation generally is not necessary for preparing most types of needle-punched fiber mats, or for making adhesive-bound plywood-substitutes.

Computerized Measuring, Recording, and Payment Systems

The total weights of all post-consumer carpet rolls supplied by a certain carpet installer (or other contractor) will be divided into categories, so that proper payment to that contractor can be calculated. Higher values (applied on a per pound basis) will be paid for carpet that is in acceptable rolls that can be fed directly into a chopping or shredding machine or other processing operation. Lower values (or in some cases nothing) will be paid for rolls that require special handling, or that fall into other less-desirable categories, such as because they are heavily stained, dirty, or dusty, or because they contain substantial numbers of staples or other unwanted components that might decrease the value of some types of output products. The lower values for these types of rolls can be calculated using any agreed-upon basis, such as a lower rate per pound, or a standard rate per pound minus a fixed deduction per roll for any roll that requires special handling.

All payment calculations will be done by a computerized processing system, which will contain memory registers that can temporarily store the bar code identification number, weight, and quality rating for each and every roll of post-consumer carpet that passes through the system. That information can be processed by the computer, to generate a "payment due" figure (along with supporting records and account information) for each and every contractor that deposited one or more used carpet rolls into the collection trailer that was being unloaded during that operation.

If desired, this type of computer processing can be done by the same computer that initially records the data on incoming carpet rolls; alternately, those data can be transferred to any other computer, for processing. A computer (or computer network) which calculates the payments due to each contractor, each month, can be hooked directly to a printer that will print the actual checks; alternately, any such computer can convey data on carpet rolls to a centralized computer that will process data into payment figures and checks, by any suitable means, such as periodic data transfers through a "local area network" (LAN) or modem connection, or via floppy disks, recordable CD-ROM's, or any other suitable media.

Additional Comments

In the manner described above, each contractor that deposits rolls of used post-consumer carpet into any collection trailer that is part of the system can be paid a fair and reasonable price, on a regular basis (such as monthly, bimonthly, quarterly, etc.), for all post-consumer carpet rolls which had his/its numbered, bar-coded tags attached to the rolls. This will create a powerful profit motive for carpet installers, demolition contractors, and other people and companies that handle discarded carpet to join this system. It also will create an efficient and economical method for a carpet recycling company to obtain discarded carpet from all or nearly all carpet installers throughout an entire city, county, or region.

This system will be adopted more widely and rapidly, if participating contractors are assured that it will be run fairly and honestly. This can be accomplished by using various business, accounting, and legal methods, which are implemented and enforced by a single company that can grant area franchising and/or other types of interactive licensing rights to local operators. As one possible type of arrangement, franchising contracts can be developed and used for this purpose. Each franchising contract will be between a single nationwide company, and a certain franchisee person or company that will obtain, under its franchise, exclusive rights to run this system within a defined geographical area. This will enable the nationwide franchisor company to require and enforce various standards of service by all franchisees, through a combination of initial licensing requirements, ongoing operating standards, monitoring and onsite inspections, and authorized use of company-owned service marks and trademarks.

In addition, because of the profit potential involved, this system offers a feasible and reasonable method for providing "curbside pickup" service. This would allow any owner of a home, condominium, store, etc., who wishes to discard an old used carpet, to call a local phone number, and arrange for a van or truck to come by and take away that carpet, without any cost to the homeowner. Any agency (such as a charitable agency that is training welfare recipients to work) can apply to the recycling company to be selected as its curbside pickup agency, either for an entire city, county, or region, or for some portion thereof. Since the recycling company can control the phone number which will be used to call in pickup requests, it can exert complete control over which agency will be used to do that work. If performance reports are unsatisfactory, it can switch agencies seamlessly, and with no disruption to the pickup service.

In summary, this network requires a company to acquire (such as by purchase, leasing, or hiring such services through contract operators, or by securing these services through a network of local franchise owners) a coordinated system of machines and devices, which will include the following:

1. A computer system with a printer and accompanying software that enable it to print out any desired number of bar-coded tags or labels, and that can be used to assign a unique identifying number to each and every carpet installer or other contractor that agrees to participate in this carpet recycling operation.

2. One or more towable trailer boxes which can serve as collection boxes for discarded carpet rolls, and which can be hitched to and towed by any conventional diesel-powered highway tractor, and which can be closed and locked when not attended, both for security purposes, and to keep the carpet segments dry when it rains or snows. In a large metropolitan area, a suitable number of these collection boxes should be placed in appropriate locations that are distributed around the city, such as in parking lots that are located near carpet retailers or warehouses.

3. Towing tractors (as conventionally used in typical 18-wheeler tractor-trailer combinations, and which can be obtained on a leased or contractor basis) which can be used to tow a loaded container to a receiving facility for unloading, and which can then return the empty container back to a desired collection location.

4. A receiving facility which has: (i) a maneuvering area that allows a driver operating an 18-wheeler tractor-trailer rig to back the rear end of the trailer up to a loading dock; (ii) a loading dock which is suitable for unloading rolls of discarded carpet from a loaded trailer box onto a covered work area or a conveyor system; (iii) a conveyor system which can carry rolls of discarded post-consumer carpet past one or more scanning devices; and, (iv) at least one scanning device which can indicate whether a roll of discarded carpet contains dangerously large metallic objects, large numbers of staples, or other unwanted components.

Preferably, the receiving facility should also contain various other machines and equipment that will enable efficient and low-cost operation. As one example, a well-designed receiving facility preferably should also contain an automated sorting system, which will interact with the conveyor and scanning systems in a manner which allows automatic diversion of carpet rolls that do not meet certain quality standards into a separate collection area, so that they can be handled in a suitable manner (such as by sending them to cement kilns, for burning) without decreasing the value of higher-quality rolls that are being processed and sent to other destinations by the scanning and sorting system in the receiving facility.

In addition, as noted above, at least some receiving facilities also should have chopping and shredding systems, and manufacturing machines that can convert shredded carpet fibers into salable output products. If those devices are not present at a certain receiving facility, then that particular facility should instead have a packing and/or baling system, for packing carpet segments (or chopped carpet segments, shredded carpet fibers, etc.) into large bales or suitable packing containers, so that they can be loaded onto trucks, barges, or railroad cars, so that they can be transported to another facility for more processing.

Thus, there has been disclosed a new and useful method, system, and combination of machinery which can be used to allow efficient and economical collection of discarded post-consumer carpet, using the services of numerous independent carpet installers and other contractors who use this system with minimal effort and expense, and who can be provided with a profit incentive to ensure good participation in this system. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention.

What is claimed is:

1. A carpet disposal method, comprising:
   a) collecting carpet, said carpet collecting performed by a collection agent, said collection agent having a unique identifier;
   b) assigning said collection agent unique identifier to said collected carpet;
   c) transporting said uniquely identified carpet to a processing plant;
   d) identifying said collection agent of said uniquely identified carpet at said processing plant;
   e) sorting said uniquely identified carpet;
   f) valuing said sorted carpet;
   g) paying said identified collection agent the value of said sorted carpet.

2. The carpet disposal method of claim 1, wherein:
said unique identifier comprises a code.

3. The carpet disposal method of claim 2, wherein:
said step of identifying said collection agent of said uniquely identified carpet at said processing plant comprises determining said uniquely identified carpet code.

4. The carpet disposal method of claim 3, wherein:
said step of identifying said collection agent of said uniquely identified carpet at said processing plant comprises reading said uniquely identified carpet code.

5. The carpet disposal method of claim 1, wherein:
said unique identifier comprises a bar code; and
said step of identifying said collection agent of said uniquely identified carpet at said processing plant comprises reading said uniquely identified carpet bar code.

6. The carpet disposal method of claim 1, wherein:
said step of identifying said collection agent of said uniquely identified carpet at said processing plant further comprises associating said uniquely identified carpet with said identified collection agent.

7. The carpet disposal method of claim 1, wherein:
said step of identifying said collection agent of said uniquely identified carpet at said processing plant further comprises:
associating said uniquely identified carpet unique identifier with said collection agent, using a database to determine the identity of said collection agent having said unique identifier assigned to said uniquely identified carpet.

8. The carpet disposal method of claim 5, wherein:
said step of identifying said collection agent of said uniquely identified carpet at said processing plant further comprises:
associating said uniquely identified carpet bar code of said uniquely identified carpet with said collection agent, using a database adapted to determine the identity of said collection agent having said uniquely identified carpet bar code assigned to said uniquely identified carpet.

9. The carpet disposal method of claim 5, wherein:
said step of identifying said collection agent of said uniquely identified carpet at said processing plant further comprises:
associating said uniquely identified carpet bar code of said uniquely identified carpet with said collection agent, using a computer comprising a database adapted to determine the identity of said collection agent having said uniquely identified carpet bar code assigned to said uniquely identified carpet.

10. The carpet disposal method of claim 1, wherein:
said step of sorting said uniquely identified carpet further comprises determining if said carpet comprises an unwanted article, and if said carpet comprises said unwanted article sorting said carpet comprising said unwanted article into a group of at least one other carpet also comprising said unwanted article.

11. The carpet disposal method of claim 10, wherein:
said unwanted article comprises a metal.

12. The carpet disposal method of claim 1, wherein:
said step of sorting said uniquely identified carpet further comprises scanning said carpet and determining if said carpet comprises an unwanted article, and if said carpet comprises said unwanted article sorting said carpet comprising said unwanted article into a group of at least one other carpet also comprising said unwanted article.

13. The carpet disposal method of claim 1, wherein:
said step of sorting said uniquely identified carpet further comprises determining if said carpet comprises a selected polymer, and if said carpet comprises said selected polymer sorting said carpet comprising said selected polymer into a group of at least one other carpet also comprising said selected polymer.

14. The carpet disposal method of claim 1, wherein:
said step of sorting said uniquely identified carpet further comprises scanning said carpet and determining if said carpet comprises a selected polymer, and if said carpet comprises said selected polymer sorting said carpet comprising said selected polymer into a group of at least one other carpet also comprising said selected polymer.

15. The carpet disposal method of claim 1, further comprising:
baling and/or packing said sorted carpet.

16. The carpet disposal method of claim 1, further comprising:
recycling said sorted carpet.

17. The carpet disposal method of claim 1, further comprising:
chopping and/or shredding said sorted carpet.

18. The carpet disposal method of claim 1, further comprising: chopping and/or shredding said sorted carpet into a coarse mixture.

19. The carpet disposal method of claim 1, further comprising:
processing said sorted carpet into a product.

20. The carpet disposal method of claim 19, wherein said product is from the group consisting of:
needle-punched fiber mat, sheet material, fiber, nylon fiber, and pelletized material.

21. The carpet disposal method of claim 1, further comprising the steps of:
transporting said uniquely identified carpet to an intermediate location; and
storing said uniquely identified carpet at said intermediate location;
said steps of transporting said uniquely identified carpet to said intermediate location and storing said uniquely identified carpet at said intermediate location being performed prior said step of transporting said uniquely identified carpet to said processing plant.

22. The carpet disposal method of claim 1, further comprising the step of:
shipping said sorted carpet from said processing plant to an alternate location.

23. The carpet disposal method of claim 1, further comprising the step of:
managing the steps of identifying said collection agent of said uniquely identified carpet at said processing plant, sorting said uniquely identified carpet, valuing said sorted carpet, and paying said identified collection agent said value of said sorted carpet with a computer adapted to manage said steps.

24. A carpet disposal system, comprising:
a) means for collecting carpet, said carpet collection means performed by a collection agent, said collection agent having a unique identifier;
b) means for assigning said collection agent unique identifier to said collected carpet;
c) means for transporting said uniquely identified carpet to a processing plant;
d) an identifier adapted to identify said collection agent of said uniquely identified carpet at said processing plant;
e) means for sorting said uniquely identified carpet;
f) means for valuing said sorted carpet;
g) means for paying said identified collection agent the value of said sorted carpet.

25. The carpet disposal system of claim 24, further comprising:
  computer means for managing:
    said identifier adapted to identify said collection agent of said uniquely identified carpet at said processing plant;
    said means for sorting said uniquely identified carpet;
    said means for valuing said sorted carpet;
    said means for paying said identified collection agent said value of said sorted carpet.

26. The carpet disposal system of claim 24, wherein:
  said unique identifier comprises a code.

27. The carpet disposal system of claim 26, wherein:
  said means for identifying said collection agent of said uniquely identified carpet at said processing plant comprises means for determining said uniquely identified carpet code.

28. The carpet disposal system of claim 27, wherein:
  said identifier adapted to identify said collection agent of said uniquely identified carpet at said processing plant comprises a reader adapted to identify said uniquely identified carpet code.

29. The carpet disposal system of claim 24, wherein:
  said unique identifier comprises a bar code; and
  said identifier adapted to identify said collection agent of said uniquely identified carpet at said processing plant comprises a reader adapted to identify said uniquely identified carpet bar code.

30. The carpet disposal system of claim 24, wherein:
  said identifier adapted to identify said collection agent of said uniquely identified carpet at said processing plant comprises means for associating said uniquely identified carpet with said identified collection agent.

31. The carpet disposal system of claim 24, wherein:
  said identifier adapted to identify said collection agent of said uniquely identified carpet at said processing plant comprises:
    database means for associating said uniquely identified carpet unique identifier with said collection agent adapted to determine the identity of said collection agent having said unique identifier assigned to said uniquely identified carpet.

32. The carpet disposal system of claim 29, wherein:
  said identifier adapted to identify said collection agent of said uniquely identified carpet at said processing plant comprises:
    database means for associating said uniquely identified carpet bar code with said collection agent adapted to determine the identity of said collection agent having said bar code assigned to said uniquely identified carpet.

33. The carpet disposal system of claim 29, wherein:
  said identifier adapted to identify said collection agent of said uniquely identified carpet at said processing plant comprises:
    computer means comprising a database adapted to associate said uniquely identified carpet bar code with said collection agent to determine the identity of said collection agent having said bar code assigned to said uniquely identified carpet.

34. The carpet disposal system of claim 24, wherein:
  said means for sorting said uniquely identified carpet further comprises means for determining if said carpet comprises an unwanted article, and if said carpet comprises said unwanted article said sorting means sorts said carpet comprising said unwanted article into a group of at least one other carpet also comprising said unwanted article.

35. The carpet disposal system of claim 34, wherein:
  said unwanted article comprises a metal.

36. The carpet disposal system of claim 24, wherein:
  said means for sorting said uniquely identified carpet further comprises means for scanning said carpet and determining if said carpet comprises an unwanted article, and if said carpet comprises said unwanted article said sorting means sorts said carpet comprising said unwanted article into a group of at least one other carpet also comprising said unwanted article.

37. The carpet disposal system of claim 24, wherein:
  said means for sorting said uniquely identified carpet further comprises means for determining if said carpet comprises a selected polymer, and if said carpet comprises said selected polymer said sorting means sorts said carpet comprising said selected polymer into a group of at least one other carpet also comprising said selected polymer.

38. The carpet disposal system of claim 24, wherein:
  said means for sorting said uniquely identified carpet further comprises means for scanning and determining if said carpet comprises a selected polymer, and if said carpet comprises said selected polymer said sorting means sorts said carpet comprising said selected polymer into a group of at least one other carpet also comprising said selected polymer.

39. The carpet disposal system of claim 24, further comprising:
  means for baling and/or packing said sorted carpet.

40. The carpet disposal system of claim 24, further comprising:
  means for recycling said sorted carpet.

41. The carpet disposal system of claim 24, further comprising:
  a chopper and/or shredder adapted to chop and/or shred said sorted carpet.

42. The carpet disposal system of claim 24, further comprising:
  a chopper and/or shredder adapted to chop and/or shred said sorted carpet into a coarse mixture.

43. The carpet disposal system of claim 24, further comprising:
  means for processing said sorted carpet into a product.

44. The carpet disposal system of claim 43, wherein said product is from the group consisting of:
  needle-punched fiber mat, sheet material, fiber, nylon fiber, and pelletized material.

45. The carpet disposal system of claim 24, further comprising:
  means for transporting said uniquely identified carpet to an intermediate location; and
  means for storing said uniquely identified carpet at said intermediate location;
  said transportation and said storage at said intermediate location being performed prior to said transportation to said processing plant.

46. The carpet disposal system of claim 24, further comprising:
  means for shipping said sorted carpet from said processing plant to an alternate location.

* * * * *